US012780343B2

(12) United States Patent
Kwak et al.

(10) Patent No.: US 12,780,343 B2
(45) Date of Patent: Nov. 3, 2026

(54) SAFETY DEVICE STORAGE KIT FOR PERSONAL MOBILITY APPARATUS

(71) Applicants: Hyundai Motor Company, Seoul (KR); Kia Corporation, Seoul (KR); Hyundai Mobis Co., Ltd., Seoul (KR)

(72) Inventors: Dae Young Kwak, Hwaseong-si (KR); Jang Mook Lim, Hwaseong-si (KR); Mun Seok Jeong, Hwaseong-si (KR); Kyu Sang Lee, Yongin-si (KR); Seok Hoon Ko, Yongin-si (KR); Dae Chang Jung, Hwaseong-si (KR)

(73) Assignees: Hyundai Motor Company, Seoul (KR); Kia Corporation, Seoul (KR); Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 18/931,875

(22) Filed: Oct. 30, 2024

(65) Prior Publication Data

US 2025/0136221 A1 May 1, 2025

(30) Foreign Application Priority Data

Oct. 30, 2023 (KR) ........................ 10-2023-0146791

(51) Int. Cl.

| | |
|---|---|
| ***B62J 27/20*** | (2020.01) |
| ***A41D 13/018*** | (2006.01) |
| ***B62J 43/30*** | (2020.01) |
| ***B62J 45/41*** | (2020.01) |

(52) U.S. Cl.

CPC ............ *B62J 27/20* (2020.02); *A41D 13/018* (2013.01); *B62J 43/30* (2020.02); *B62J 45/41* (2020.02)

(58) Field of Classification Search

CPC ........ A41D 2600/102; A41D 2600/104; A41D 13/018; B60R 21/20; B62K 3/002; B62J 27/20; A42B 3/0486

See application file for complete search history.

(56) References Cited

U.S. PATENT DOCUMENTS 4,325,108 A 4/1982 Spingler
5,162,006 A * 11/1992 Yandle, II ................ A62B 7/02
280/733
5,199,619 A 4/1993 Mostashari
(Continued)

FOREIGN PATENT DOCUMENTS

JP 2010132016 A * 6/2010
KR 960005946 B1 * 5/1996 ........... A42B 3/0433
(Continued)

OTHER PUBLICATIONS

Hong Wan-Ki, Auto Bicycle Helmet With Air Bag, May 6, 1996, USPTO, KR 960005946 B1, Machine Translation of Description (Year: 1996).*
(Continued)

*Primary Examiner* — James A English
(74) *Attorney, Agent, or Firm* — Slater Matsil, LLP

(57) ABSTRACT

A safety device storage kit for a personal mobility apparatus can store an airbag module wearable on a user of the personal mobility apparatus securely against the risk of theft and loss and provide a hygienic usage environment through an automatic sterilization process after the use of the airbag module.

19 Claims, 33 Drawing Sheets

(56) References Cited

U.S. PATENT DOCUMENTS

| | | | | |
|---|---|---|---|---|
| 5,716,026 | A * | 2/1998 | Pascasio | B64D 11/00 244/118.6 |
| 6,731,202 | B1 | 5/2004 | Klaus | |
| 8,325,027 | B2 | 12/2012 | Tee et al. | |
| 8,974,098 | B2 | 3/2015 | Mccaslin et al. | |
| 9,630,669 | B2 | 4/2017 | Slaughter | |
| 9,956,905 | B2 | 5/2018 | White et al. | |
| 10,390,580 | B2 | 8/2019 | Olsson et al. | |
| 11,303,143 | B2 | 4/2022 | Taylor et al. | |
| 11,518,328 | B2 * | 12/2022 | Wendelrup | A42B 3/0486 |
| 11,692,843 | B2 | 7/2023 | Cun et al. | |
| 11,812,151 | B2 | 11/2023 | Chen et al. | |
| 12,195,129 | B2 | 1/2025 | Song | |
| 12,515,754 | B2 | 1/2026 | Lee et al. | |
| 2011/0148081 | A1 * | 6/2011 | Smith | B60R 21/20 280/733 |
| 2017/0050601 | A1 * | 2/2017 | Kobata | B60R 21/18 |
| 2019/0291804 | A1 | 9/2019 | Yu et al. | |
| 2022/0145526 | A1 * | 5/2022 | Kim | B60N 3/00 |
| 2024/0214518 | A1 | 6/2024 | Montez | |
| 2025/0120468 | A1 | 4/2025 | Ramberg et al. | |
| 2025/0136219 | A1 * | 5/2025 | Kwak | B62J 3/10 |
| 2025/0176651 | A1 | 6/2025 | Hamzaoui | |

FOREIGN PATENT DOCUMENTS

| | | | | |
|---|---|---|---|---|
| KR | 20220162209 | A * | 12/2022 | F26B 21/004 |
| SG | 10202000753 | S * | 8/2020 | |

OTHER PUBLICATIONS

Shimai et al., Air Bag for Neck Part, and Portable Kit of Air Bag for Neck Part, Jun. 17, 2010, EPO, JP 2010-132016 A, Machine Translation of Description (Year: 2010).*

Gul Won Bang, A keeping-box of safety cap for the motor-driven board, Dec. 8, 2022, EPO, KR 2022-0162209 A, Machine Translation of Description (Year: 2022).*

* cited by examiner

A-A Cross Section

SAFETY DEVICE STORAGE KIT FOR PERSONAL MOBILITY APPARATUS

CROSS-REFERENCE TO RELATED APPLICATIONS

This application claims the benefit of Korean Patent Application No. 10-2023-0146791, filed on Oct. 30, 2023, which is hereby incorporated by reference as if fully set forth herein.

TECHNICAL FIELD

The present disclosure relates to a safety device storage kit for a personal mobility apparatus.

BACKGROUND

The recent increasing use of smart mobilities for a first mile or last mile has expanded the use of sharing services such as a service for sharing electric scooters.

Accordingly, regulations on devices required to promote the safety of users of electric scooters have also been intensified, and wearing safety devices such as a safety helmet for the safety of users when using electric scooters has recently become mandatory. This may be considered appropriate particularly given that severe injuries from electric scooter-related accidents are mainly on heads or faces.

Therefore, users of personal mobility apparatuses such as electric scooters need to use safety helmets personally owned by the users or share safety helmets provided by sharing service providers.

However, the use of safety helmets is relatively low because the helmets may press and mess up the hair of the users or the users may experience the inconvenience of having to carry their own safety helmets with them all the time.

The safety helmets provided by the sharing service providers are exposed to the outside and used multiple times repeatedly by unspecified users, and there may thus be anxiety and concerns about contamination and hygiene.

Further, if a user does not carry a safety helmet with them all the time, there may be a risk of theft and loss, and because of this, the sharing service providers may not be able to provide the safety helmets to such users with ease.

SUMMARY

The present disclosure relates to a safety device storage kit and, more particularly, to a safety device storage kit for a personal mobility apparatus, which stores an airbag module wearable on a user of the personal mobility apparatus securely against a risk of theft and loss and provides a hygienic usage environment through an automatic sterilization process after the use of the airbag module.

An embodiment of the present disclosure can provide a safety device storage kit for a personal mobility apparatus, which may store an airbag module wearable on a user of the personal mobility apparatus securely against a risk of theft and loss and may provide a hygienic usage environment through an automatic sterilization process after the use of the airbag module.

To solve the preceding technical problems, according to at least one embodiment of the present disclosure, there can be provided a safety device storage kit for a personal mobility apparatus, which can include an airbag module wearable on a user, a housing in which the airbag module is received, a cover adapted to cover the housing, and a fastening portion adapted to couple the housing to the personal mobility apparatus, wherein the airbag module comprises an airbag adapted to wrap around the user when being worn.

The airbag module may include a sensor configured to sense an external impact, a controller configured to determine whether to deploy the airbag, a battery configured to provide power, and a charging module configured to receive power for charging the battery in the housing, and the housing can include an inner wall portion configured to support an inner circumferential surface of the airbag module, and a mounting portion recessed on a bottom of the housing to allow the charging module to be inserted.

The inner wall portion may include a barrier wall protruding from a center of one side wall of the housing toward an inner space, a first inner wall spaced apart from one side of the barrier wall and protruding from a bottom surface of the housing toward an upper space, and a second inner wall spaced apart from an opposite side of the barrier wall and protruding from the bottom surface of the housing toward the upper space.

An ultraviolet-C (UVC) light-emitting diode (LED), or UVC LED, may be provided on a front surface of the barrier wall and a circumference of the first inner wall and the second inner wall to sterilize an inner circumferential surface of the airbag module.

The mounting portion may further include a charging terminal adapted to provide power for charging the battery a smart device.

The mounting portion may further include a guide portion extending toward both sides of the charging terminal to temporarily grip both sides of the smart device.

The housing may further include a heat exchanger adapted to start operating as a cooling means upon detecting that a cooling target is received in the mounting portion and stop operating upon detecting that the cooling target is removed from the mounting portion.

The housing may further include a pressure sensor provided on a bottom of the mounting portion to detect an object being received.

The pressure sensor may be adapted to measure a change in stroke value induced by being pressed by the object and transmit the change to a controller provided in the housing, and the controller may be adapted to determine whether the airbag module is received based on the change in stroke value.

The fastening portion may include a housing coupling portion including a body fixed to one side of the housing, a swivel hinge adapted to rotate by an external force while being fastened to the housing coupling portion, a swivel bracket adapted to provide a space in which the swivel hinge rotates, and a fixed bracket coupled to the swivel bracket while engaged with a steering shaft of the personal mobility apparatus.

The swivel hinge may include: a first fixing portion fixed to the housing coupling portion; a second fixing portion disposed on a bottom surface of the first fixing portion and fixed to the swivel bracket; and a rotation shaft coupled perpendicularly to the first fixing portion and the second fixing portion that overlap each other, such that the first fixing portion and the second fixing portion have the same rotation center but rotate at different heights.

The swivel bracket may have, on one side thereof, a fixing portion fastening groove to which the second fixing portion is bolted, and may have, on the other side thereof, a bracket fastening groove to which the fixed bracket is bolted.

The fixing portion fastening groove may include a pair of fixing portion fastening grooves one located on an upper portion and the other located on a lower portion with respect to an area in which the rotation shaft is disposed, or a pair of fixing portion fastening grooves one located on a left side and the other located on a right side with respect to the area in which the rotation shaft is disposed.

The swivel bracket may further include at least one stopper protruding from one side of the fixing portion fastening groove upward a bottom surface of the swivel bracket to limit a rotation direction and a rotation radius of the first fixing portion.

The at least one stopper may include a first stopper installed at one diagonal position of both sides of the fixing portion fastening groove with respect to a position of the rotation shaft and formed to protrude to limit a rotation of the first fixing portion, and a second stopper installed at the other diagonal position of the both sides and formed to protrude to support the fixing portion fastening groove to which the second fixing portion is coupled without limiting the rotation of the first fixing portion.

The housing coupling portion may be formed in a double-walled structure with an outer wall and an inner wall, and the swivel bracket may be inserted in a space between the outer wall and the inner wall.

At least one fixed protrusion protruding outwardly and adapted to be repeatedly compressed by an elastic body provided therein may be formed on an outer circumferential surface of the inner wall of the housing coupling portion, and at least one fixed recess recessed outwardly may be formed on an inner wall of the swivel bracket.

The fixed bracket may include a detachable switch adapted to apply an external force to separate the fixed bracket from the swivel bracket, a spring adapted to be compressed by an external force applied to the detachable switch and restored to its original state upon removal of the external force, and a fixed bracket hook comprising a catching protrusion to which the swivel bracket is coupled by snap-fit coupling, and adapted to be released from the swivel bracket by a compression of a spring and remain coupled to the swivel bracket upon removal of the external force.

The safety device storage kit may further include a detachable battery adapted to provide power for charging the airbag module through the charging module, and a battery receiving portion, which provides a space in which the detachable battery is mounted, formed on the bottom surface of the housing to be electrically connected to the charging module.

The detachable battery may have a battery hook formed on one outer side of the detachable battery for snap-fit coupling, and the battery receiving portion may have a battery catching protrusion on which the battery hook is hung.

The detachable battery may have an inwardly recessed battery groove provided on one outer side of the detachable battery for battery locking, and the battery receiving portion may have a battery locking device provided to be inserted into or released from the battery groove by a rotational operation.

According to various embodiments of the present disclosure described above, there may be advantages of storing an airbag module that may be worn by a user of a personal mobility apparatus safely against the risk of being stolen or lost, and of providing a hygienic usage environment through automatic sterilization of the airbag module after use.

In an embodiment of the present disclosure, there may also be advantages of reducing the volume required for storage by allowing a housing in which the airbag module is received to be easily rotated while coupled to a steering shaft of the personal mobility apparatus.

In an embodiment of the present disclosure, there may also be advantages of minimizing the space required for storage and transportation by rotating the housing, thereby improving the recovery efficiency of operators who provide personal mobility apparatuses through a sharing service.

The advantages that can be achieved from an embodiment of the present disclosure are not necessarily limited to those described above, and other advantages not described above may also be clearly understood by those skilled in the art from the following description.

DETAILED DESCRIPTION OF ILLUSTRATIVE EMBODIMENTS

Hereinafter, example embodiments of the present disclosure will be described in detail with reference to the accompanying drawings. The example embodiments are not construed as necessarily limiting embodiments to those specifically disclosed and other embodiments can be understood to include all changes, equivalents, and replacements within the ideas and the technical scopes of the present disclosure. The terms “module,” “unit,” and/or “-er/or” for referring to elements can be assigned and used interchangeably in consideration of the convenience of description, and thus the terms per se do not necessarily have different meanings or functions. The terms “module,” “unit,” and/or “-er/or” do not necessarily require physical separation.

Although terms including ordinal numbers, such as “first, ” “second,” and the like, may be used herein to describe various elements, the elements are not necessarily limited by these terms. These terms can be used merely to distinguish one element from another.

When an element is described as “coupled” or “connected” to another element, the element may be directly coupled or connected to the other element. However, it can be understood that another element may be present therebetween. In contrast, when an element is described as “directly coupled” or “directly connected” to another element, it can be understood that there are no other elements therebetween.

The singular forms “a,” “an,” and “the” can be intended to include the plural forms as well, unless the context clearly indicates otherwise. It can be further understood that the terms “comprises/comprising” and/or “includes/including” used herein specify the presence of stated features, integers, steps, operations, elements, and/or components, but do not preclude the presence or addition of one or more other features, integers, steps, operations, elements, components and/or groups thereof.

Figure 1:
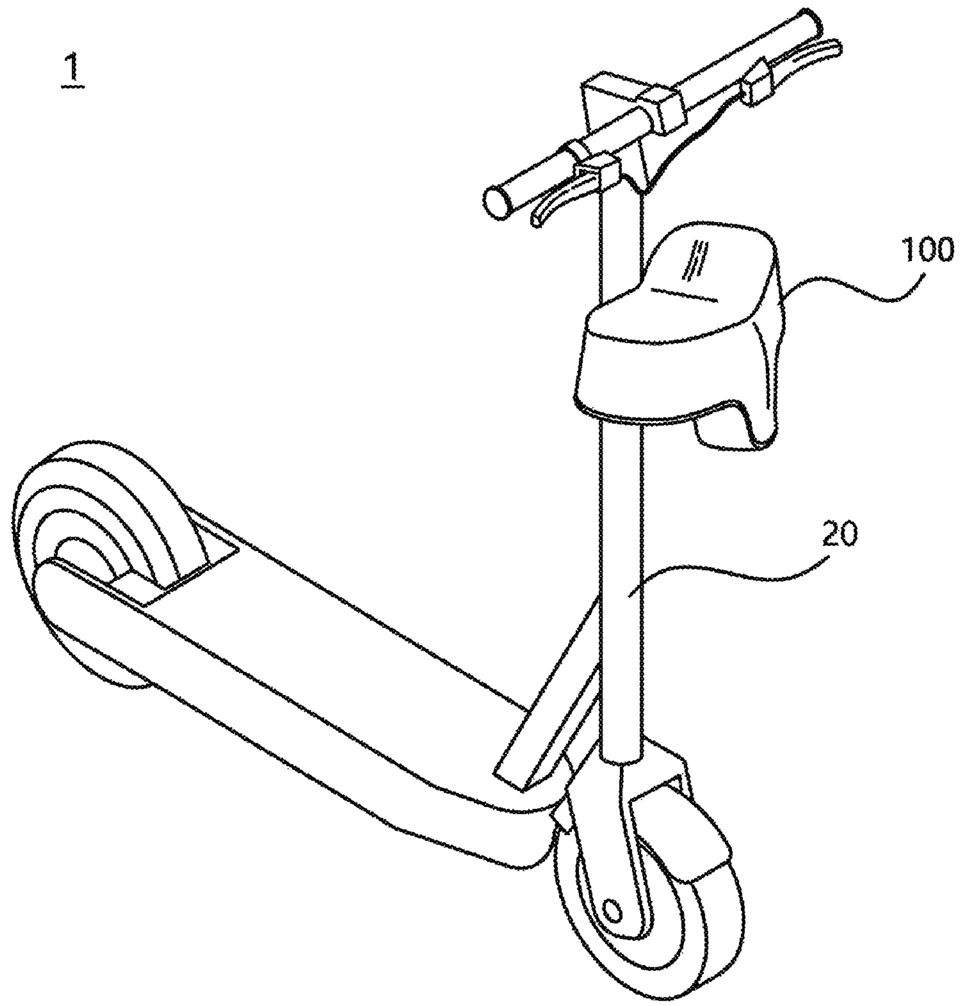
FIG. 1 is a perspective view showing an electric scooter to which a kit for storing a safety device of a personal mobility apparatus (also herein a "safety device storage kit for a personal mobility apparatus") is applied, according to an embodiment of the present disclosure.
Figure 2:
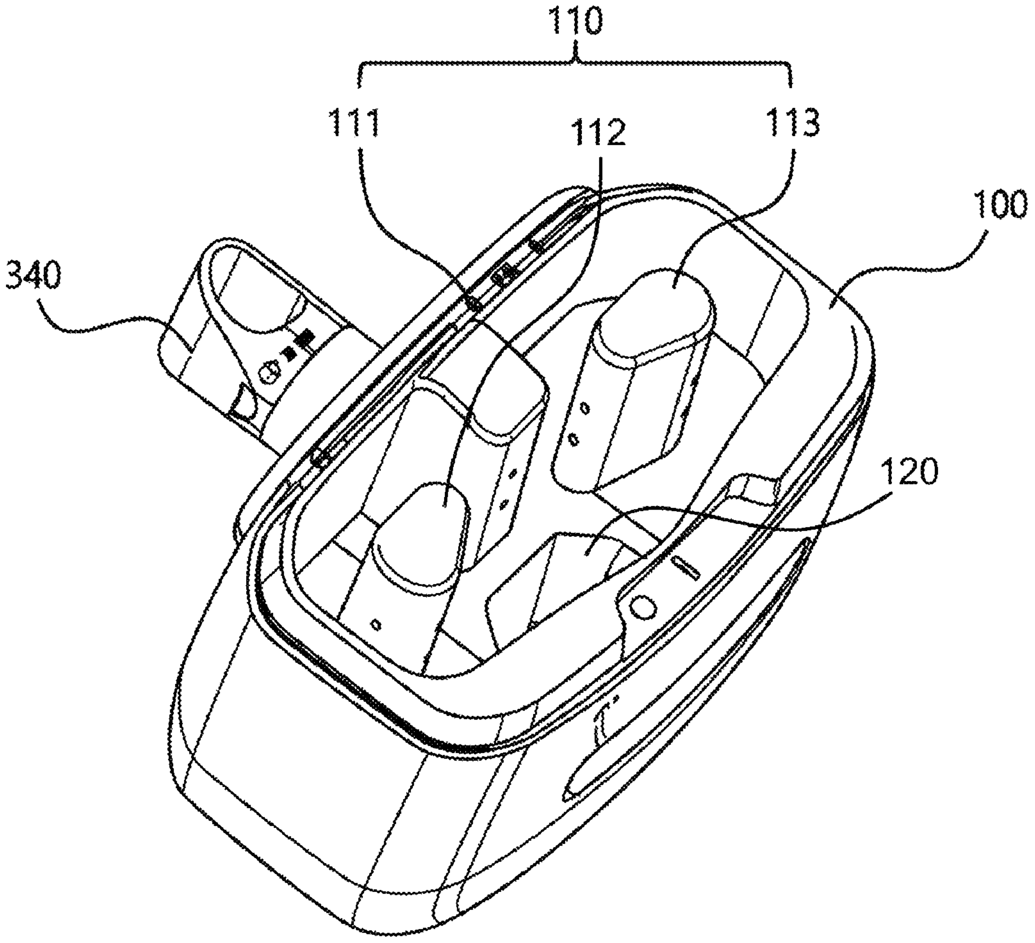
FIG. 2 is an internal perspective view showing a housing according to an embodiment of the present disclosure.

Hereinafter, example embodiments of the present disclosure will be described in detail with reference to the accompanying drawings. FIG. 1 is a perspective view showing an electric scooter to which a kit for storing a safety device of a personal mobility apparatus (also herein a “safety device storage kit for a personal mobility apparatus”) is applied, according to an embodiment of the present disclosure. FIG. 2 is an internal perspective view showing a housing according to an embodiment of the present disclosure.

Referring to the figures, according to an embodiment of the present disclosure, a safety device storage kit for a personal mobility apparatus 1 may include: a housing 100 in which an airbag module 10 wearable on a user can be received; a cover 200 adapted to cover the top of the housing 100 to prevent an entry of foreign matters; and a steering shaft fastening portion 300 adapted to couple one side of the housing 100 to a steering shaft 20 of the personal mobility apparatus 1.

As shown in FIG. 1 and other figures, the safety device storage kit may be fixedly installed on the steering shaft 20 of the personal mobility apparatus 1, and inside thereof the airbag module 10, which is a personal safety device, may be received to prevent contamination by external contaminants and prevent theft or loss.

Figure 3:
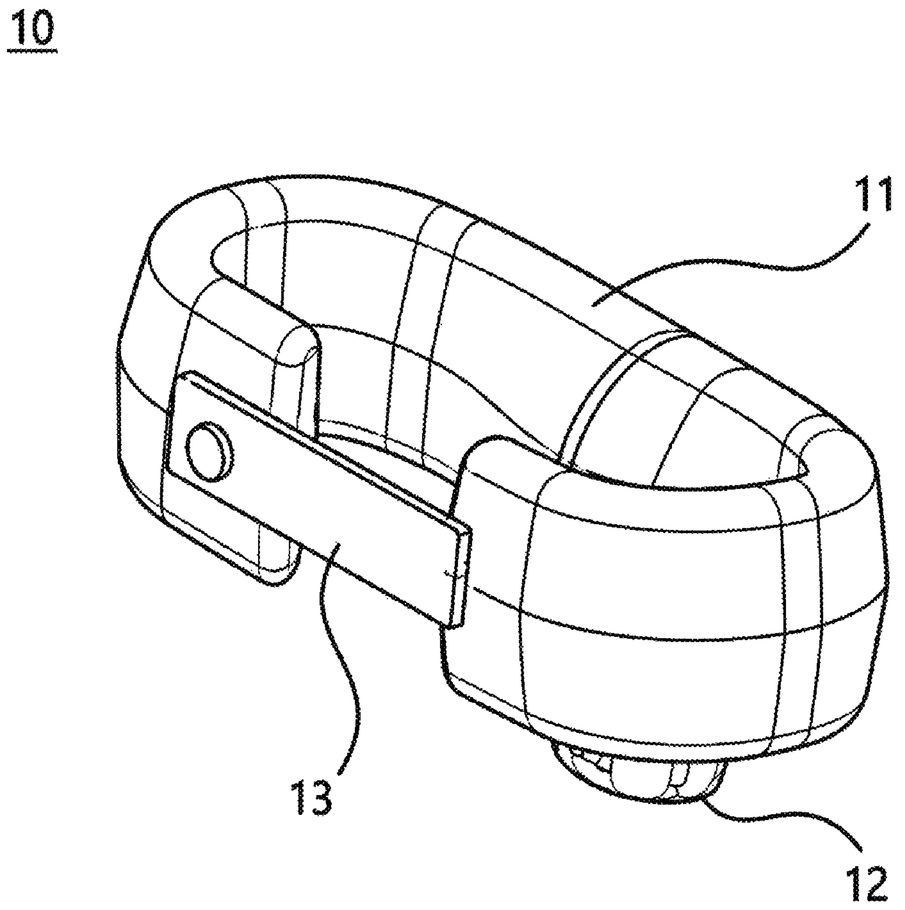
FIG. 3 is a perspective view showing an airbag module in an activated state according to an embodiment of the present disclosure.
Figure 4:
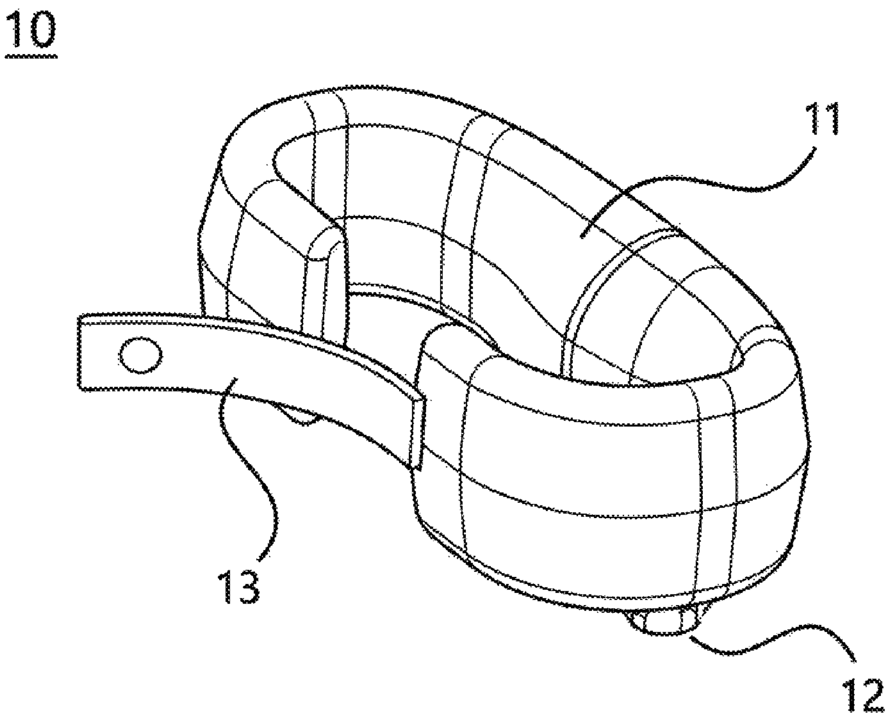
FIG. 4 is a perspective view showing an airbag module in a deactivated state according to an embodiment of the present disclosure.

The airbag module 10 may be provided in a form that wraps around the neck of a user with one side thereof being open as shown FIGS. 3 and 4, and may detect an applied external impact in an activated state to deploy an airbag, thereby protecting the head of the user.

The airbag module 10 may include an airbag helmet 11 adapted to wrap around the neck of the user while being worn; a sensor adapted to sense an external impact applied to the user through the personal mobility apparatus 1; a controller adapted to determine whether to deploy the airbag based on a sensing result of the sensor; and an activation device 13 adapted to determine whether to switch the sensor and the controller to be an activated state or remain them in a deactivated state.

The airbag module 10 may further include a charging module 12 in which the sensor and the controller can be received and a battery providing power for operating the sensor and the controller can be provided, which can be adapted to receive power for charging the battery while being received in the housing 100.

The airbag helmet 11 may have one side that is open for facilitating the wearing by the user, and such an opening of the airbag helmet 11 may be locked by the activation device 13 as shown in FIG. 4 to prevent the airbag module 10 from being dislodged from the neck of the user during an operation of the personal mobility apparatus 1.

When the activation device 13 is coupled to the other side of the airbag helmet 11 while closing the opening of the airbag helmet 11, the sensor and the controller may be switched to the activated state, and when the activation device 13 is separated from the other side of the airbag helmet 11, the sensor and the controller may be switched to the deactivated state.

The airbag module 10 may be a wearable safety device that may be used as a safety helmet for a user (also a "wearer" herein) of a personal mobility apparatus (e.g., the personal mobility apparatus 1) and may also be used as a device for protecting the safety of a faller at a construction site or the like, for example. The airbag module 10 may be a safety device used in various forms as described above. Because the present disclosure relates to a storage kit for storing such an airbag module, a more detailed description of this airbag module itself will be omitted here.

FIGS. 3 and 4 show the airbag module 10 provided in the form having an open space on one side thereof, and show an example where the airbag module 10 enters the activated state when the open space is closed by the activation device 13. This is provided only as an example, and an airbag module may also be provided in the form of a closed ring that wraps around the neck of a wearer without such an open space, and an airbag module may be adapted to enter the activated state automatically by a switch operation by a user or by a human body wearing detection sensor, for example.

As shown in FIG. 2, the housing 100 may include an inner wall portion 110 spaced apart to support an inner circumferential surface of the airbag module 10, and a mounting portion 120 recessed on a bottom of the housing 100, into which the charging module 12 provided in the airbag module 10 can be inserted.

The inner wall portion 110 may include: a barrier wall 11 protruding from the center of one side wall of the housing 100 toward an inner space; a first inner wall 112 spaced apart on one side relative to the barrier wall in and protruding from the bottom surface of the housing 100 toward an upper space; and a second inner wall 113 spaced apart on the other side relative to the barrier wall 111 and protruding from the bottom surface of the housing 100 toward the upper space, configured to receive the airbag module 10 such that inner circumferential surfaces contacting the body of the wearer are spaced apart without being in contact with each other to perform sterilization while keeping the airbag module 10 in the deactivated state.

The barrier wall 111 may be disposed at the center of one side of an inner circumferential surface of the housing 100 to prevent both ends of the airbag module 10 from being connected to each other while the airbag module 10 is received in the housing. The activation device 13 of the airbag module 10 may be prevented from being connected while the airbag module 10 is received in the housing 100, and keep the airbag module 10 in the deactivated state while stored.

Figure 5:
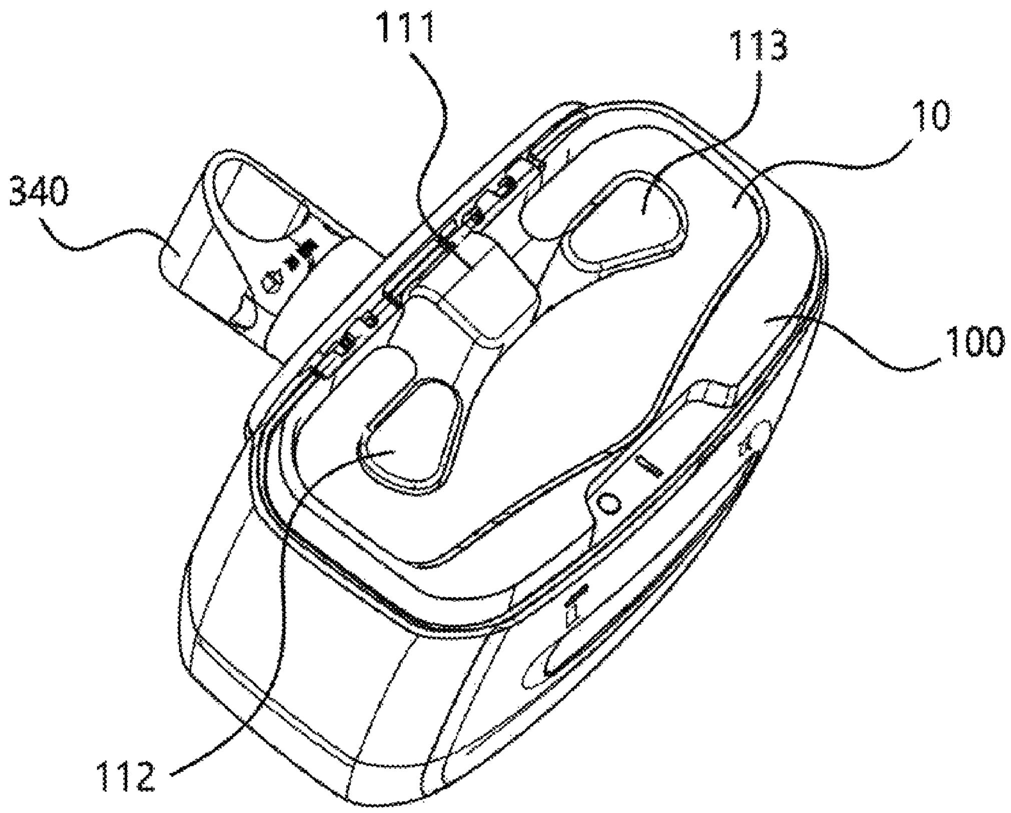
FIG. 5 is a perspective view showing a state where an airbag module is docked onto a housing according to an embodiment of the present disclosure.

As shown in FIG. 5, the first inner wall 112 and the second inner wall 113 may be spaced apart from both the inner circumferential surface of the housing 100 and the barrier wall 11 such that they are surrounded by both sides of the airbag module 10, respectively. The first inner wall 112 and the second inner wall 113 may be installed to be spaced apart by a distance sufficient to allow the activation device 13 to remain in a released state while the airbag module 10 is received.

The airbag module 10 may be received in the housing 100 by being docked thereto or therein, in a state where the barrier wall 11 is interposed in the open space of the airbag module 10 and the first inner wall 112 and the second inner wall 113 are interposed between the inner circumferential surfaces of both ends of the airbag module 10.

The activation device 13, when is not in the released state, may be caught by the barrier wall 11 and disallow the cover 200 from being closed, which may guide the user to receive or store the airbag module 10 properly. FIG. 5 shows a state in which the airbag module 10 can be normally received in the housing 100.

Figure 7:
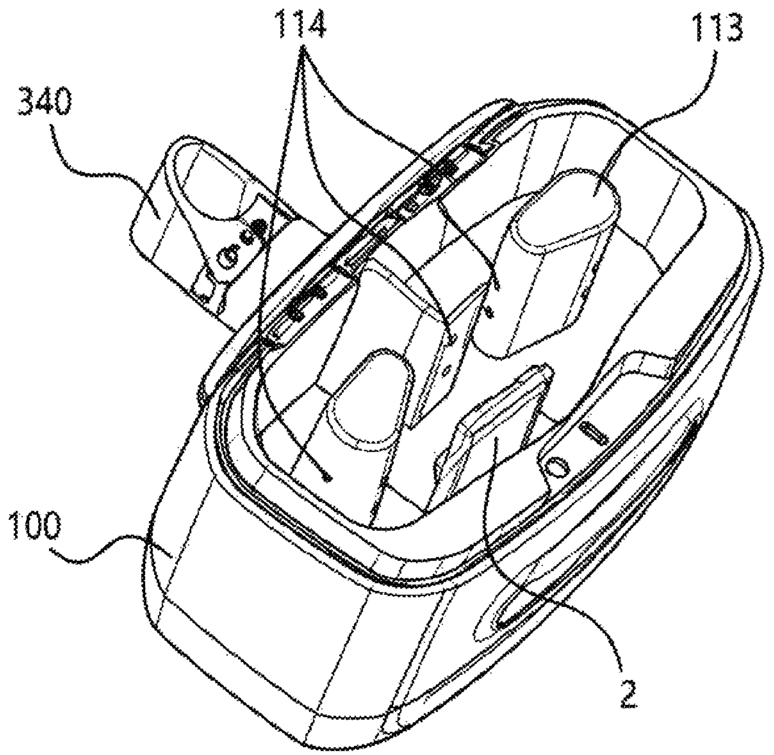
FIG. 7 is a perspective view showing a state where a smartphone is mounted on a mounting portion of a housing according to an embodiment of the present disclosure.

As shown in FIG. 7, a front side of the barrier wall 111 and a circumference of the first inner wall 112 and the second inner wall 113 may have an ultraviolet-C light-emitting diode (UVC LED) 114 to sterilize the inner circumferential surface of the airbag module 10.

The UVC LED 114 may be an LED adapted to perform sterilization and disinfection by generating ultraviolet light with a wavelength of 200 to 280 nanometers (nm) to damage the DNA and RNA molecular structures of germs or bacteria. Accordingly, while the airbag module 10 is stored inside the housing 100 after used, the UVC LED 114 may sterilize or disinfect areas that have been in contact with the body of the user during the use of the personal mobility apparatus 1 such as an electric scooter, and may thus maintain a clean state.

Figure 6:
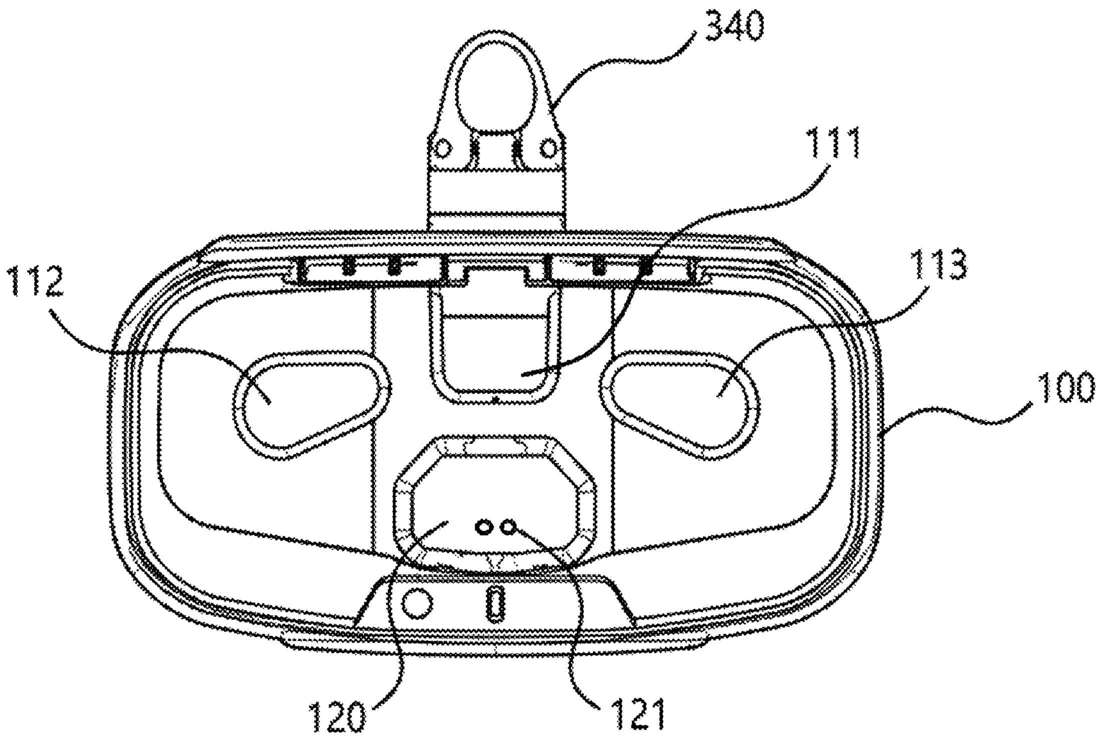
FIG. 6 is a top view showing an internal configuration of a housing according to an embodiment of the present disclosure.

As shown in FIG. 6, the mounting portion 120, a space in which the charging module 12 provided in the airbag module 10 can be inserted, may be formed to be recessed on the bottom of the housing 100 and have, on its bottom surface, a charging terminal 121 to which the charging module 12 can be electrically connected for charging the battery provided in the airbag module 10.

The mounting portion 120 may be provided in various shapes, based on the shape and position of the charging terminal 121 provided in the charging module 12. Although the mounting portion 120 is shown in FIG. 6 as being disposed in front of the barrier wall 11, examples are not limited thereto, and it is to be understood that it is formed in various ways depending on the shape and position of the charging module 12 received in the housing 100.

An inner space of the housing 100 may be used as a storage space while the airbag module 10 is in use by being worn on the user after taken out for the operation of the personal mobility apparatus 1.

Because the mounting portion 120 has the charging terminal 121 provided therein as shown in FIG. 7, it may allow a charging terminal of a smart device such as a smartphone or tablet to be electrically connected to the charging terminal 121 such that charging is performed.

Figure 8:
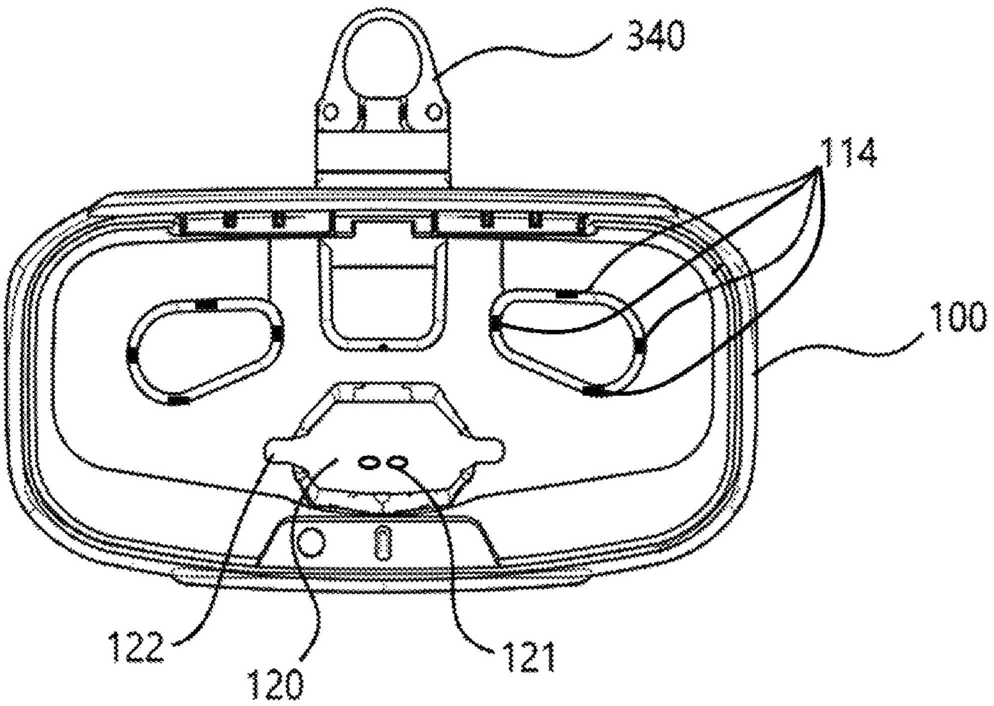
FIG. 8 is a top view showing a mounting portion of a housing formed for charging a smartphone according to an embodiment of the present disclosure.

The shape of the charging module 12 provided in the airbag module 10 and the shape of the smart device may be different. As shown in FIG. 8, the mounting portion 120 may further include a guide portion 122 extending toward both sides to temporarily grip both sides of the smart device, in order to prevent the smart device from being shaken or separated from the charging terminal 121 during the operation of the personal mobile device 1. The guide portion 122 may also extend further to be longer in preparation for a case where a target to be mounted and charged on the mounting portion 120 is a tablet personal computer (PC).

Figure 9:
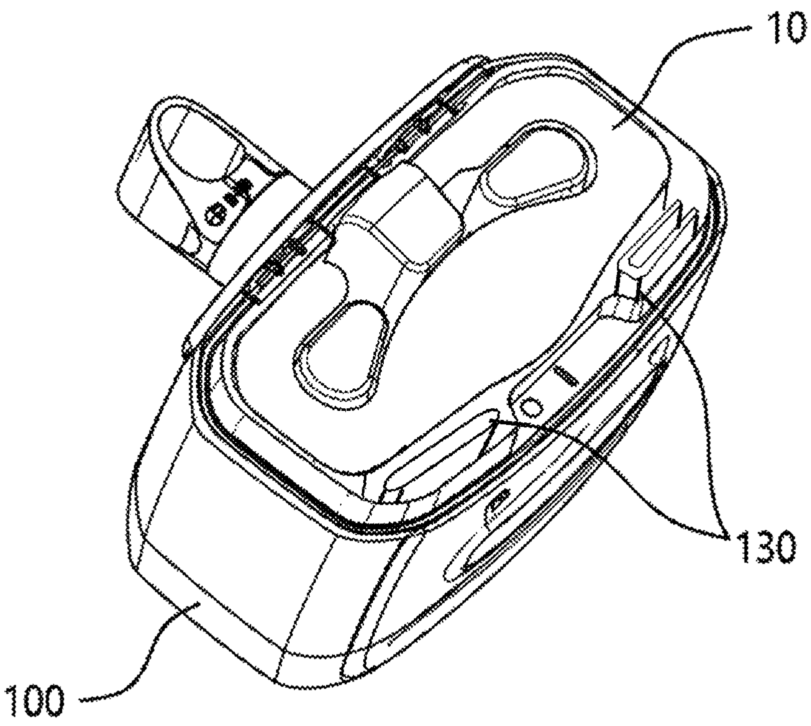
FIG. 9 is a perspective view showing a state where a portion of a housing is expanded according to an embodiment of the present disclosure.
Figure 10:
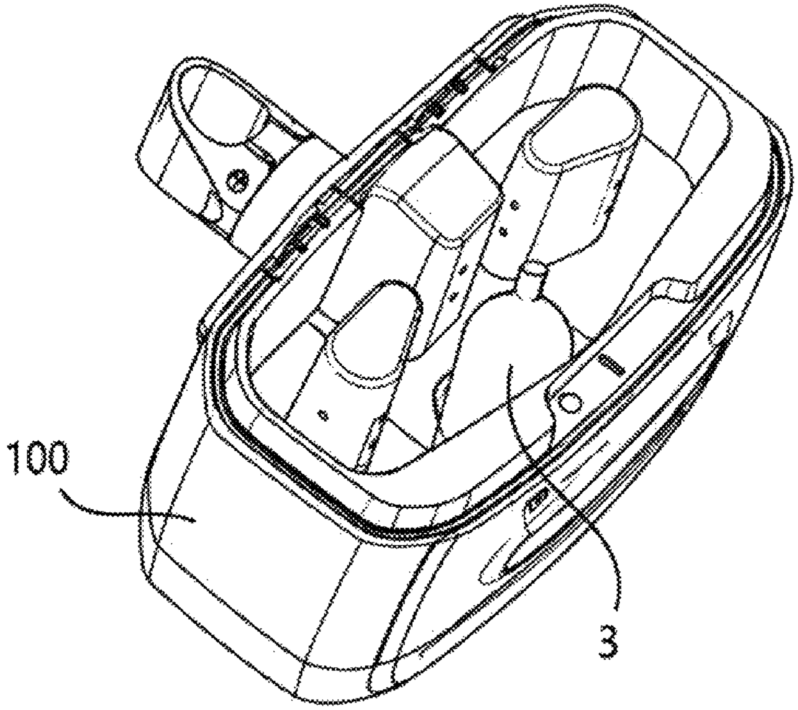
FIG. 10 is a perspective view showing a state where a water bottle is received in a mounting portion according to an embodiment of the present disclosure.

The housing 100 may use, as the storage space, a space generated when the airbag module 10 is removed therefrom, and may further have an extension 130 formed to store an item of a certain size or less such as a smartphone or wallet of the user even when the airbag module 10 is received, as shown in FIG. 9, thereby contributing to the convenience of the user using the personal mobile device 1.

Figure 11:
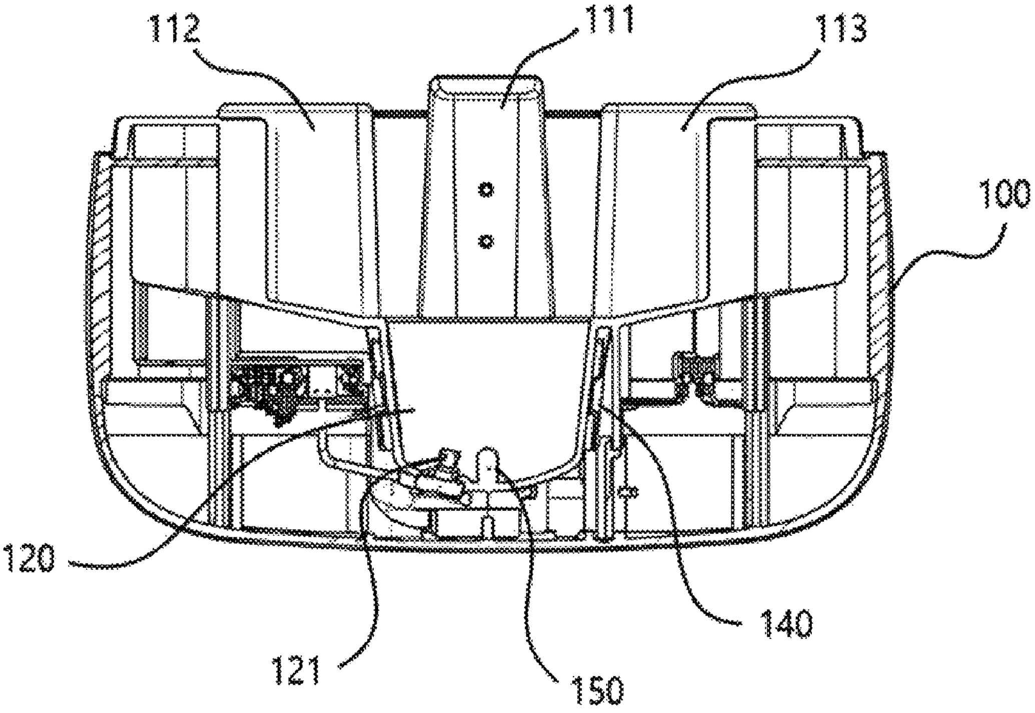
FIG. 11 is a cross-sectional view showing a state where a cooling means is provided in a mounting portion according to an embodiment of the present disclosure.

As shown in FIG. 11, the housing 100 may further include a heat exchanger 140 as a cooling device for cooling a water or beverage bottle stored in the mounting portion 120 with the airbag module 10 removed.

As shown in FIG. 11, the heat exchanger 140 may be adapted to start operating by detecting that a water or beverage bottle required to be cooled is stored in the mounting portion 120, and stop operating by detecting that the water or beverage bottle is removed from the mounting portion 120.

Accordingly, as shown in FIG. 11, the mounting portion 120 may further include a pressure sensor 150 adapted to detect whether an item is received, as it is pressed by a load of the item received above such as a water or beverage bottle and returns to its original state when the received item is removed.

On the bottom surface of the mounting portion 120, the charging terminal 121 adapted to charge the airbag module 10 or a smart device may be provided in addition to the pressure sensor 150. Accordingly, a controller 101 provided in the housing 100 for controlling an operation of the heat exchanger 140 may determine that cooling is required in the event of a detection signal generated only from the pressure sensor 150 without any electrical connection to the charging terminal 121, and may control the heat exchanger 140 to operate. The controller 101 may determine that charging of the airbag module 10 is in progress when it is determined that there is an electrical connection to the charging terminal 121 even though a detection signal is generated from the pressure sensor 150, and may control the charging power to be provided to the airbag module 10 without the operation of the heat exchanger 140.

Figure 12:
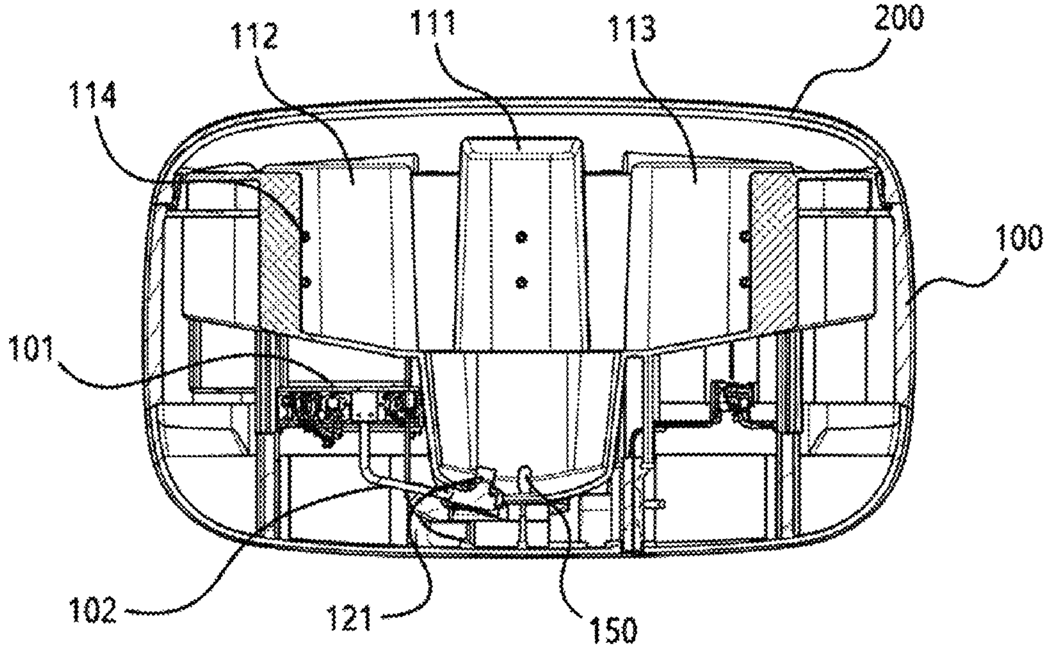
FIG. 12 is a cross-sectional view showing a mounting portion according to an embodiment of the present disclosure.
Figure 13:
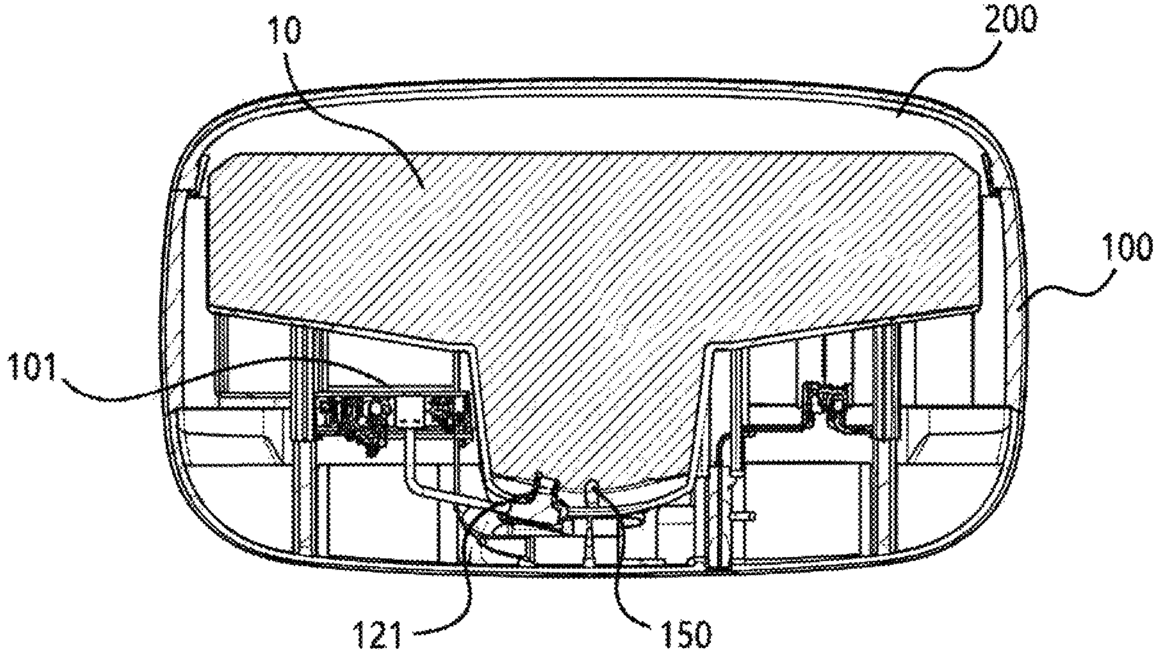
FIG. 13 is a cross-sectional view showing a mounting portion in which an airbag module is received according to an embodiment of the present disclosure.

Further, the pressure sensor 150 may be installed on the bottom surface of the mounting portion 120 to detect whether it is being pressed down by an object received in the mounting portion 120, as shown in FIGS. 12 and 13.

The pressure sensor 150 may measure a change in stroke value induced by the self-weight or shape of the object received in the mounting portion 120 and transmit it to the controller 101 provided in the housing 100.

Accordingly, by determining whether the airbag module 10 is normally received based on the change in the stroke value transmitted from the pressure sensor 150, the controller 101 may prevent an error in which the personal mobility apparatus 1 is returned while another object is received.

Based on the validity of the change in the stroke value transmitted from the pressure sensor 150 (e.g., in a case where the stroke value before the airbag module 10 is received is 0 mm, and the stroke value after the airbag module 10 is received is 5 mm), the controller 101 may determine whether the airbag module 10 is received at a normal position.

Further, when it is determined that the airbag module 10 is received at the normal position, the controller 101 may determine that the battery of the charging module 12 provided in the airbag module 10 and the charging terminal 121 provided in the housing 100 are electrically connected, and control charging to be performed.

Figure 14:
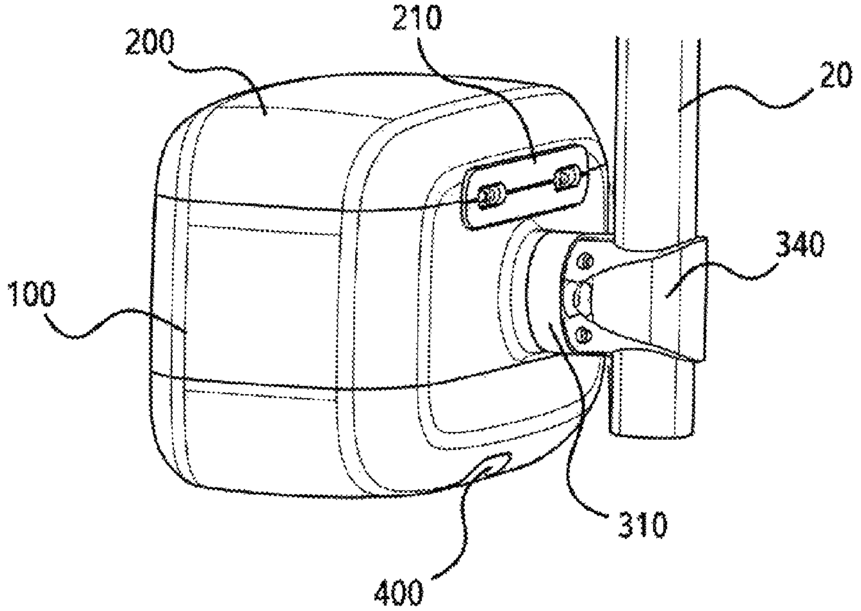
FIG. 14 is a perspective view showing a cover in a closed state according to an embodiment of the present disclosure.

As shown in FIG. 14, a cover 200, which can be a plate covering the top of the housing 100, may be pivotably coupled to the housing 100 by a hinge 210. Although the cover 200 may be provided to be completely detachable from the housing 100, there may be, in this case, a risk of being lost and being dislodged from the housing 100 during the operation of the personal mobility apparatus 1. The cover 200 may have desirably one side fixed to the housing 100 by the hinge 210.

Figure 15:
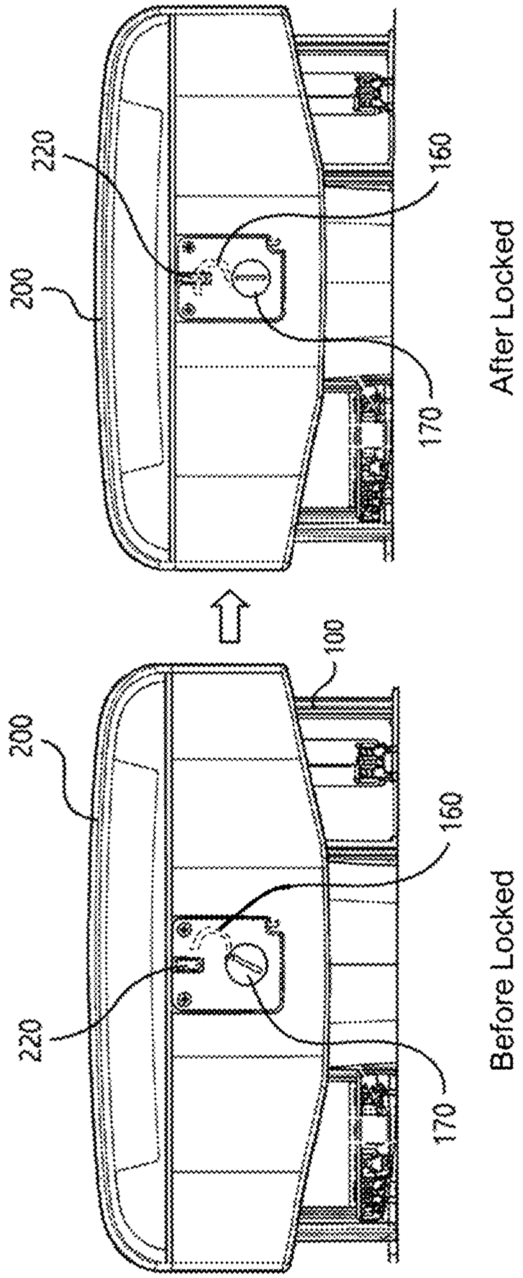
FIG. 15 is a diagram showing an open state and a locked state using a manual locking device according to an embodiment of the present disclosure.
Figure 16:
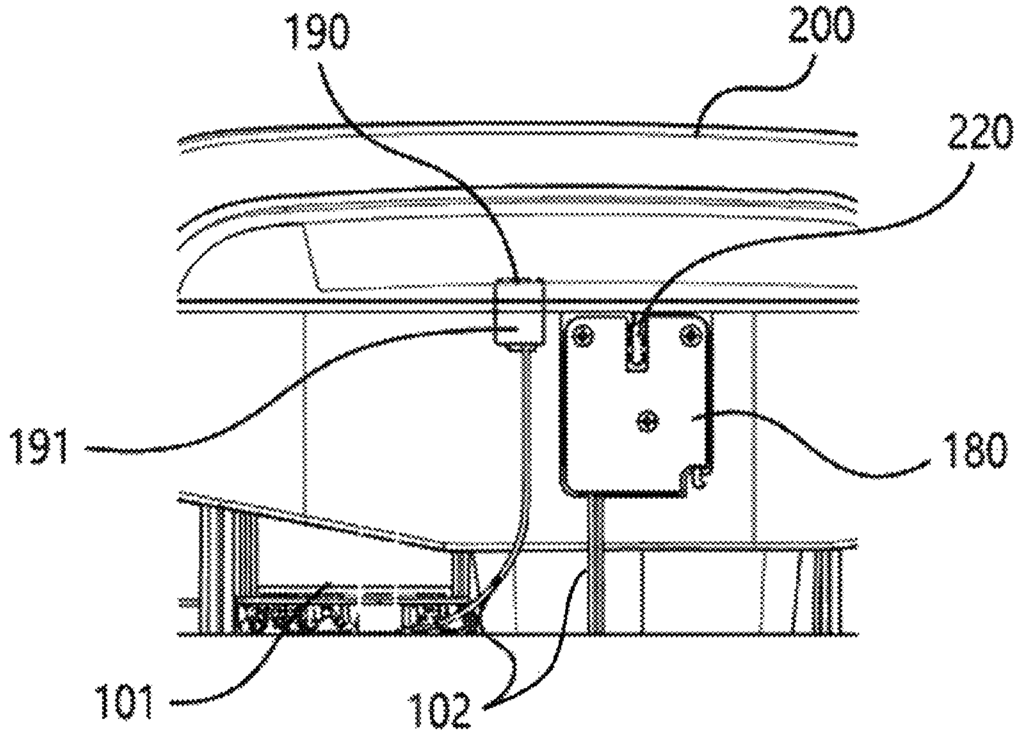
FIG. 16 is a diagram showing a locked state using an automatic locking device according to an embodiment of the present disclosure.

Further, as shown in FIGS. 15 and 16, the cover 200 may having a locking ring 220 protruding downward the bottom surface, and the housing 100 may further have a fastening ring 160 to be fastened to the locking ring 220 such that the cover 200 is fixed to the housing 100 and a locking mechanism 170 adapted to rotatably operate the fastening ring 160.

Accordingly, this may prevent the cover 200 from opening to expose the airbag module 10 while the personal mobility apparatus 1 is not in operation, and may also prevent the cover 200 from opening by an impact transferred through a footrest of the personal mobility apparatus 1 while the personal mobility apparatus 1 is in operation.

The locking mechanism 170 may be provided as a manual locking device, that is, as shown in FIG. 15, the manual locking device that may close the cover 200 to move the locking ring 220 toward the locking mechanism 170, and may then rotate the locking mechanism 170 to allow the fastening ring 160 to be fastened to the locking ring 220.

Further, the locking mechanism 170 may also be provided as an automatic locking device 180, as shown in FIG. 16. For this purpose, the cover 200 may have a magnet 190, and the housing 100 may further have a magnet sensor 191 adapted to sense contact of the magnet 190.

In such an automatic locking device 180, the magnet sensor 191 may sense contact of the magnet 190 to determine whether the housing 100 is covered with the cover 200, and may automatically rotate the fastening ring 160 to be fastened to the locking ring 220, and the automatic locking device 180 may thereby be switched to a locked state. An additional operating button may be provided for opening or closing the cover 200.

Figure 17:
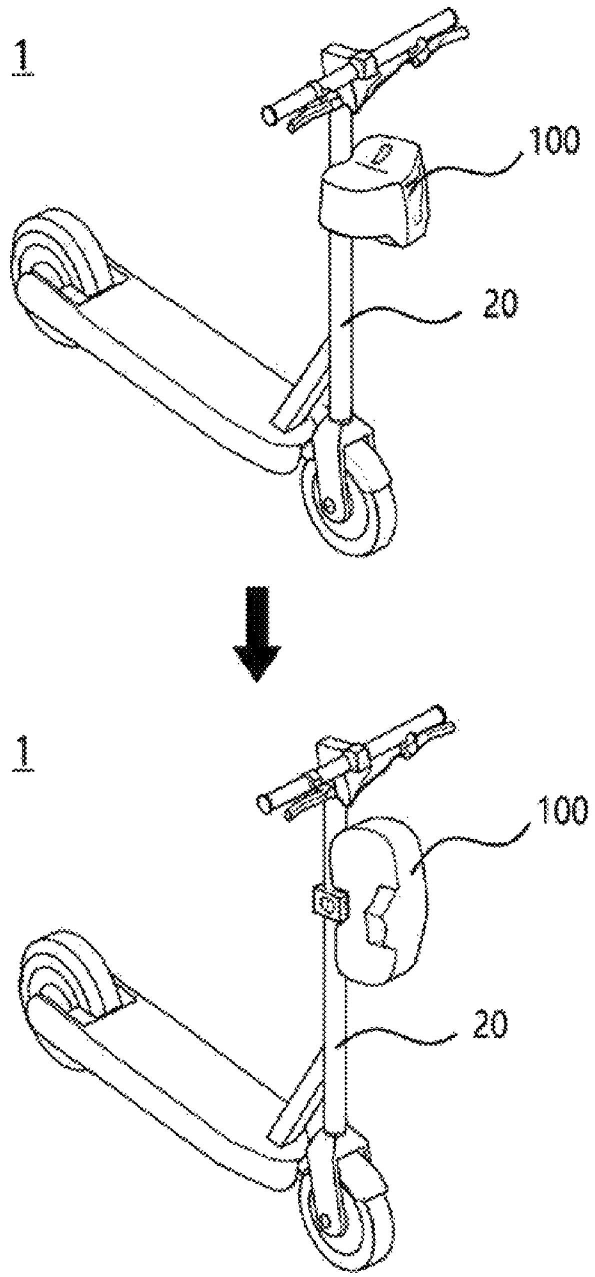
FIG. 17 is a perspective view showing an example of rotating a housing according to an embodiment of the present disclosure.

Further, the steering shaft fastening portion 300 may couple the housing 100 to the steering shaft 20 of the personal mobility apparatus 1 to store an airbag module (e.g., the airbag module 10) for each personal mobility apparatus (e.g., the personal mobility apparatus 1), and may also allow the housing 100 to rotate while coupled to the steering shaft 20 to minimize a space occupied by the housing 100 when the personal mobility apparatus 1 is kept, as shown in FIG. 17.

Accordingly, for a sharing service using personal mobility apparatuses, a space occupied by each personal mobility apparatus may not be large even at the time of recovery, which may maximize the recovery efficiency.

Figure 18:
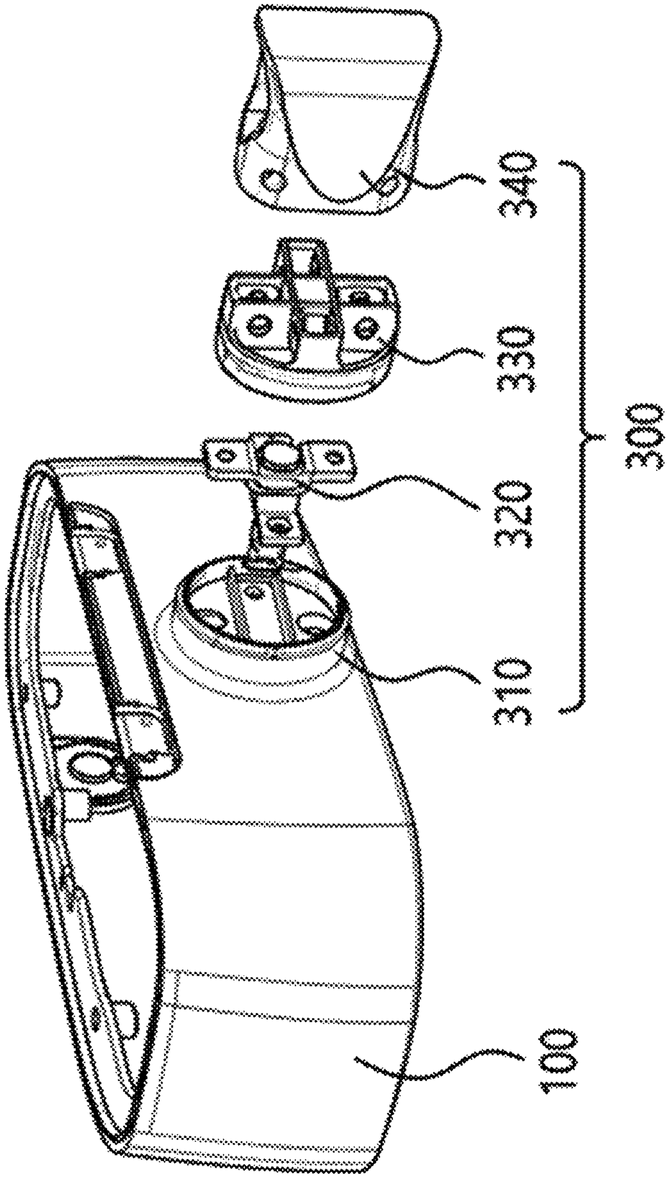
FIG. 18 is an exploded perspective view showing a steering shaft fastening portion coupled to one side of a housing according to an embodiment of the present disclosure.

The steering shaft fastening portion 300 may include: a housing coupling portion 310, which can be a body fixed to one side of the housing 100; a swivel hinge 320 rotatable by an external force while being fastened to the housing coupling portion 310; a swivel bracket 330 adapted to provide a space for the swivel hinge 320 to rotate; and a fixed bracket 340 coupled to the swivel bracket 330 while being fastened to the steering shaft 20 of the personal mobility apparatus 1, as shown in FIG. 18.

Accordingly, of the steering shaft fastening portion 300, the housing coupling portion 310 may be fixedly coupled to one side of the housing 100, the swivel hinge 320 may be coupled to the housing coupling portion 310, the swivel bracket 330 may be coupled to the swivel hinge 320 to allow the swivel hinge 320 to rotate in the swivel bracket 330, and the swivel bracket 330 may be fixedly coupled to the fixed bracket 340, which may allow only the housing 100 to rotate while maintaining a position coupled to the steering shaft 20.

The housing coupling portion 310 may have a bottom surface fixed to the housing 100 and a top surface open for a first fixing portion 321 of the swivel hinge 320 to be installed and the swivel bracket 320 to be coupled.

Figure 19:
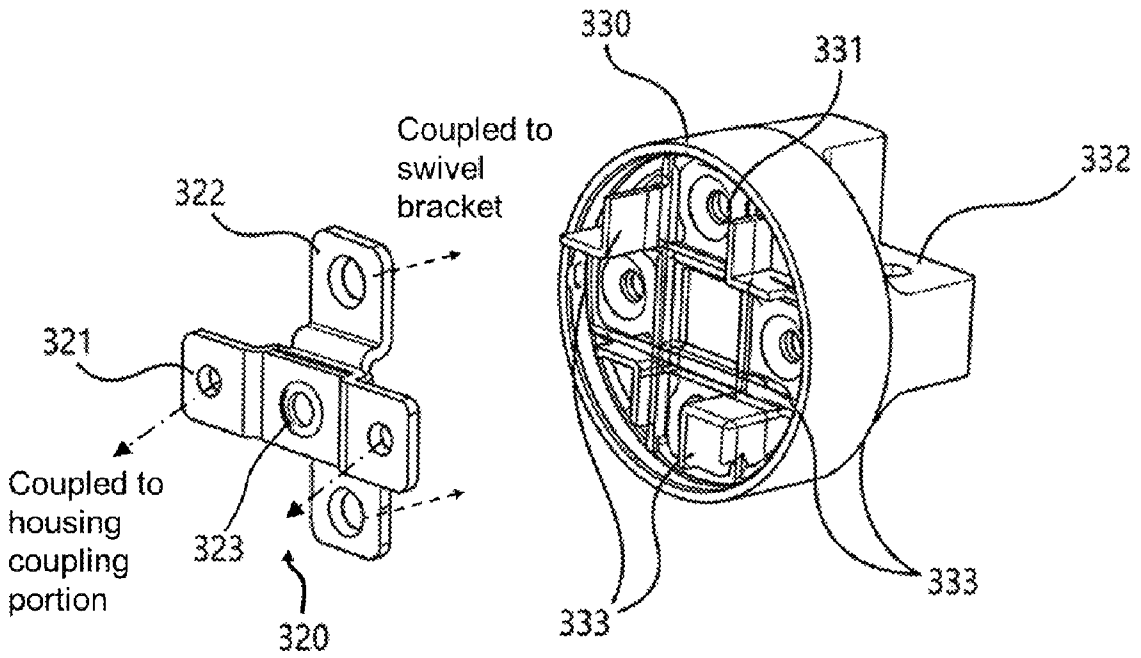
FIG. 19 is an exploded perspective view showing a swivel hinge coupled to a swivel bracket according to an embodiment of the present disclosure.

Further, as shown in FIG. 19, the swivel hinge 320 may include: the first fixing portion 321 fixed to the housing coupling portion 310; a second fixing portion 322 disposed on a bottom surface of the first fixing portion 321 and fixed to the swivel bracket 330; and a rotation shaft 323 coupled perpendicularly to the first fixing portion 321 and the second fixing portion 322 by passing therethrough such that the first fixing portion 321 and the second fixing portion 322 have the same center of rotation but rotate at different heights.

Figure 20:
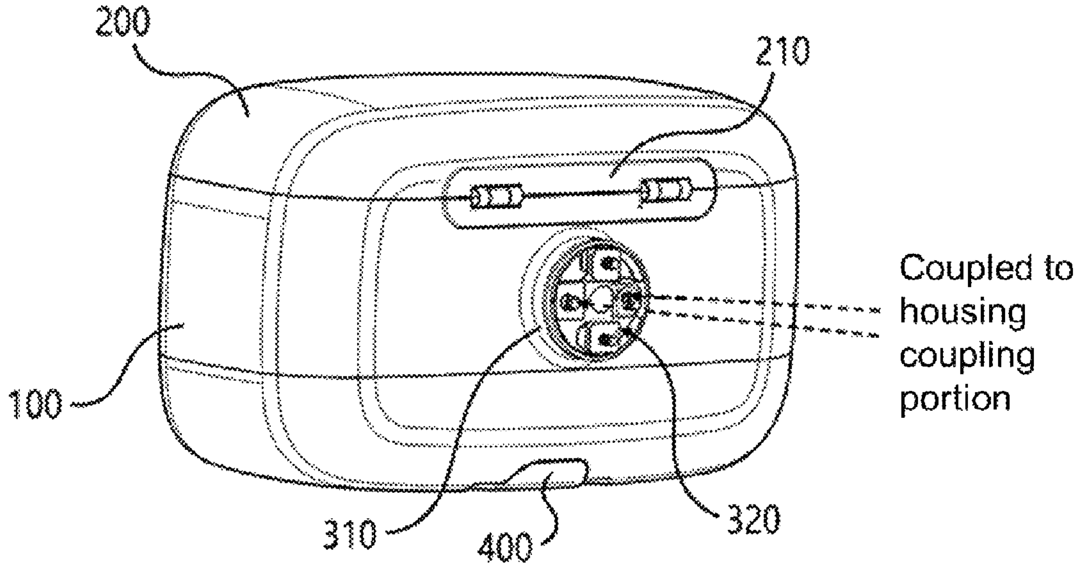
FIG. 20 is a perspective view showing a swivel hinge coupled to a housing coupling portion according to an embodiment of the present disclosure.
Figure 21:
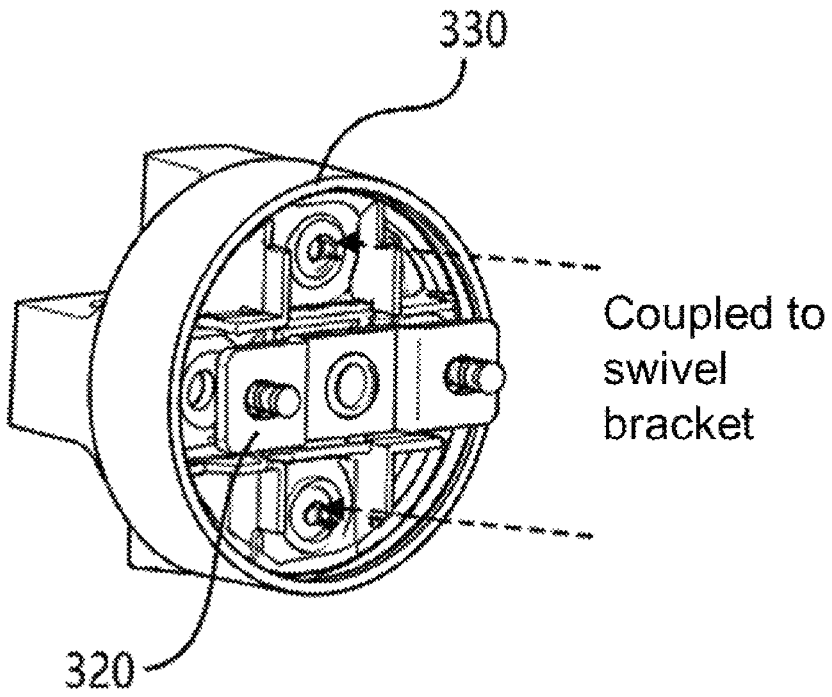
FIG. 21 is a perspective view showing a swivel bracket to which a swivel hinge is coupled according to an embodiment of the present disclosure.

The first fixing portion 321 may be bolted to the housing coupling portion 310 as shown in FIG. 20, and the second fixing portion 322 may be bolted to the swivel bracket 330 as shown in FIG. 21.

The first fixing portion 321 may rotate together with the housing 100 when an external force is applied, and the second fixing portion 322 may remain fixed under the influence of the swivel bracket 330, which can be fixed to the fixed bracket 340, despite the rotation of the housing 100. The housing 100 may rotate about the rotation shaft 323 provided in the swivel hinge 320. The housing 100 may rotate clockwise or counterclockwise about the rotation shaft 323.

Further, the swivel bracket 330 may have a fixing portion fastening groove 331 formed on one side thereof to which the second fixing portion 322 may be bolted as shown in FIG. 19, and a bracket fastening groove 332 formed on the other side to which the fixed bracket 340 may be bolted as shown in FIG. 18.

As shown in FIG. 19, the fixing portion fastening groove 331 may be formed as a pair with one at the top and the other at the bottom with respect to an area in which the rotation shaft 323 is disposed, or as a pair with one at the left and the other at the right with respect to the area in which the rotation shaft 323 is disposed, such that both sides of the second fixing portion 322 elongated up and down or left and right with respect to the rotation shaft 323 are coupled.

Accordingly, as shown in FIG. 21, the second fixing portion 322 may be bolted to a pair of fixing portion fastening grooves 331 (which is shown as fixing portion fastening grooves disposed at the top and bottom of the rotation shaft 323 in FIG. 21) to fix the swivel hinge 320 to the swivel bracket 330. That is, the second fixing portion 322 may be selectively coupled to either one of two pairs of fixing portion fastening grooves 331 depending on a desired direction of rotating the housing 100.

Further, on both sides of the fixing portion fastening groove 331, at least one stopper 333 may be further formed to protrude from one side of the fixing portion fastening groove 331 upward the bottom surface of the swivel bracket 330 in order to limit a rotation direction and a rotation radius of the first fixing portion 321. Because the second fixing portion 322 is fixed to the swivel bracket 330, the stopper 333 may limit the rotation direction and the rotation radius of the first fixing portion 321.

The stopper 333 can be disposed on one side of the fixing portion fastening groove 331 and may protrude long such that the first fixing portion 321 is caught to limit the rotation, and the stopper 333 can be disposed on the other side and may protrude short such that the first fixing portion 321 is not caught.

Figure 23:
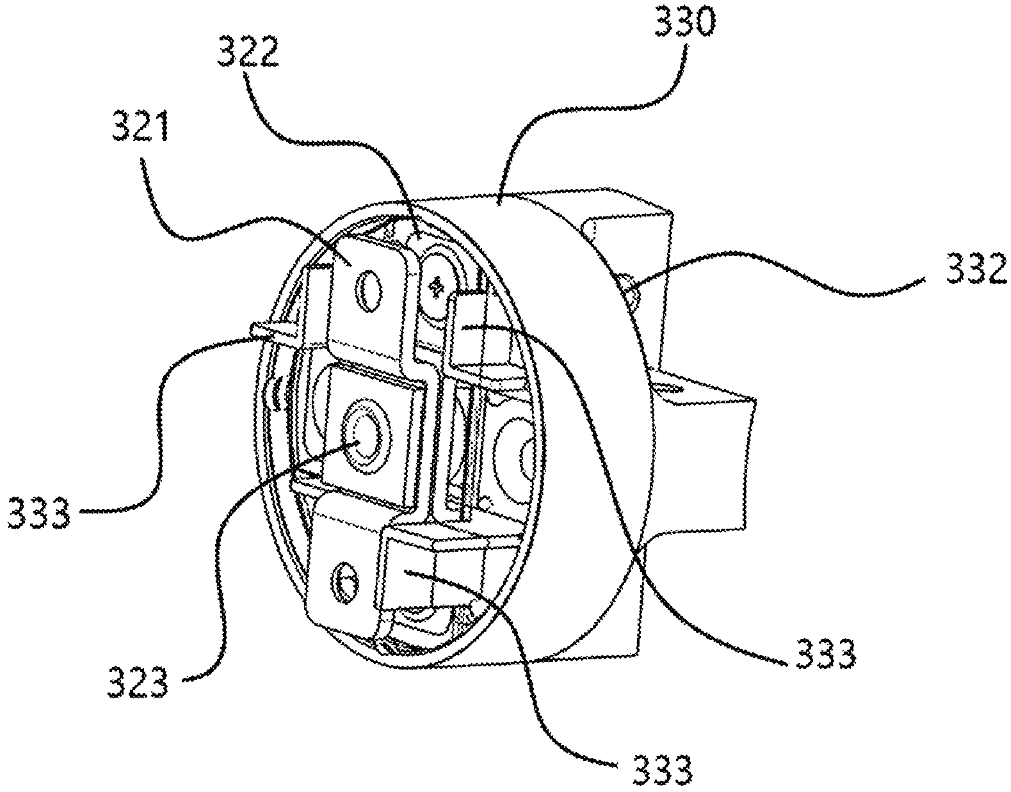
FIG. 23 is a perspective view showing a state where a rotation direction and a rotation radius of a first fixing portion are limited by a stopper according to an embodiment of the present disclosure.

Accordingly, as shown in FIG. 23, the stopper 333 can be installed at one diagonal position of the two sides of the fixing portion fastening groove 331 centered on a position of the rotation shaft 323 and may protrude long to limit the rotation of the first fixing portion 321, and the stopper 333 can be installed at the other diagonal position and may protrude short not to limit the rotation of the first fixing portion 321.

As shown in FIG. 23, the stopper 333 can be disposed at the upper left and lower right sides of the fixing portion fastening groove 331 and may protrude longer, and the stopper 333 can be disposed at the upper right and lower left sides of the fixing portion fastening groove 331 and may be formed shorter. The short stopper 333 may support one side of the fixing portion fastening groove 331 to which the second fixing portion 322 is coupled, thereby preventing the second fixing portion 322 from rotating together.

As the stopper 333 can be disposed in a diagonal direction of the fixing portion fastening groove 331 as shown in FIG. 23, the first fixing portion 321 may rotate only within a range of 90° counterclockwise.

When the swivel bracket 330 is rotated by 90° to be coupled to the fixed bracket 340, the stopper 333 limiting the rotation of the first fixing portion 321 may be located on the upper right and lower left sides of the fixing portion fastening groove 331 as shown in FIG. 21, and thus the first fixing portion 321 may rotate only within a range of 90° clockwise.

Figure 22:
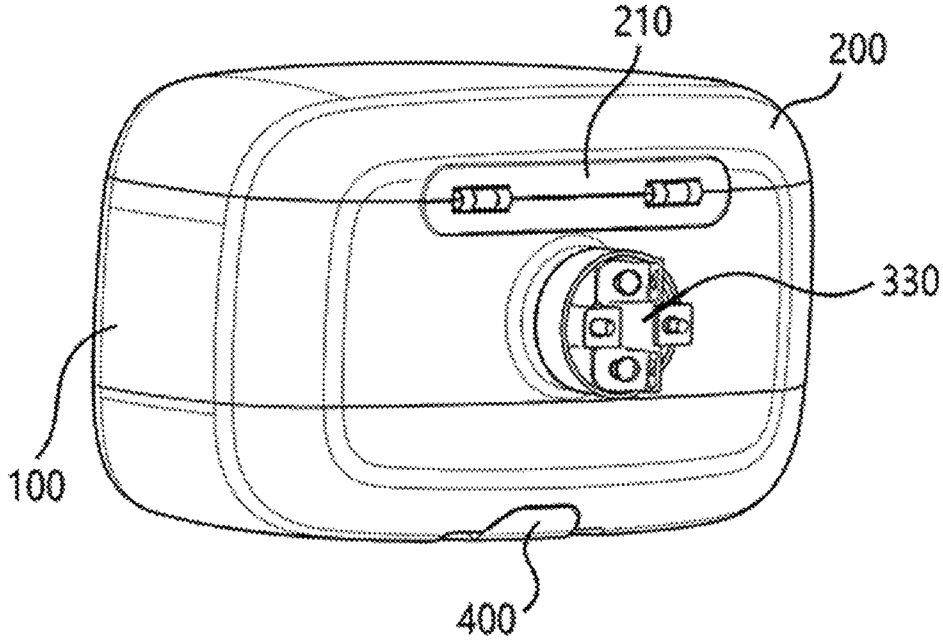
FIG. 22 is a perspective view showing a swivel hinge and a fixed bracket coupled to a housing coupling portion according to an embodiment of the present disclosure.

Further, the bracket fastening groove 332 may be formed on a plate protruding from the other side of the swivel bracket 330 to facilitate the bolting to the fixed bracket 340. The bracket fastening groove 332 may be formed on a plate protruding crosswise from the other side of the swivel bracket 330, as shown in FIG. 22, to facilitate the coupling to the fixed bracket 340.

Figure 24:
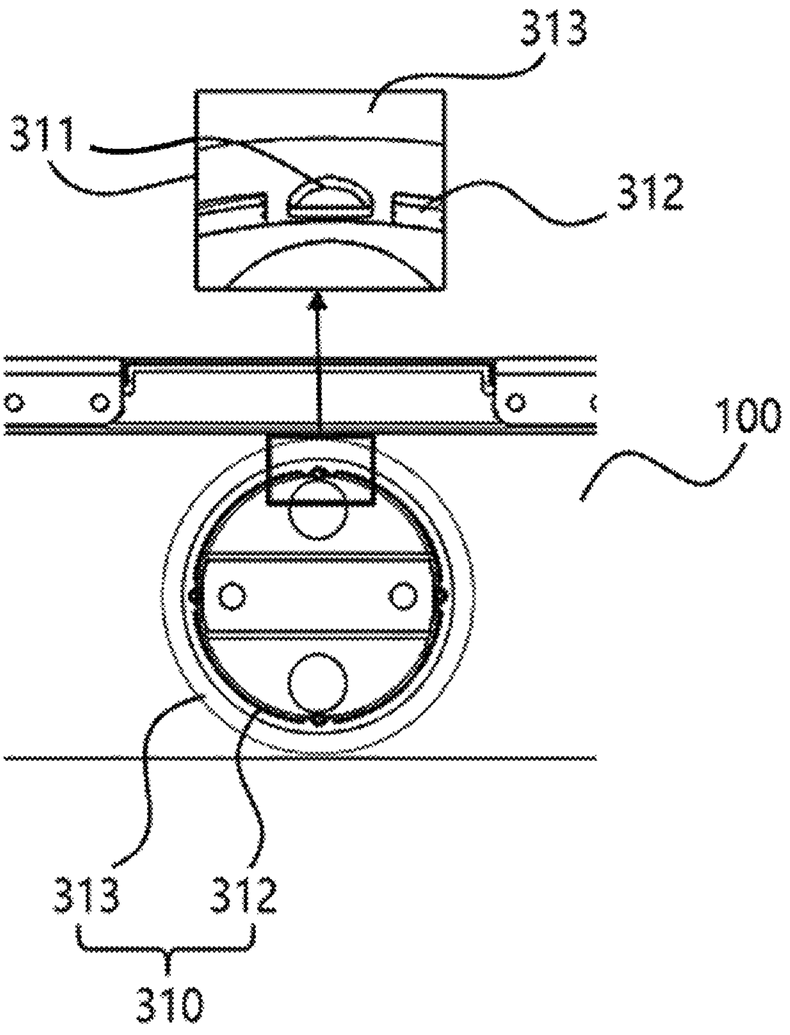
FIG. 24 is a diagram showing a fixed protrusion formed on an outer circumferential surface of an inner wall of a housing coupling portion according to an embodiment of the present disclosure.
Figure 25:
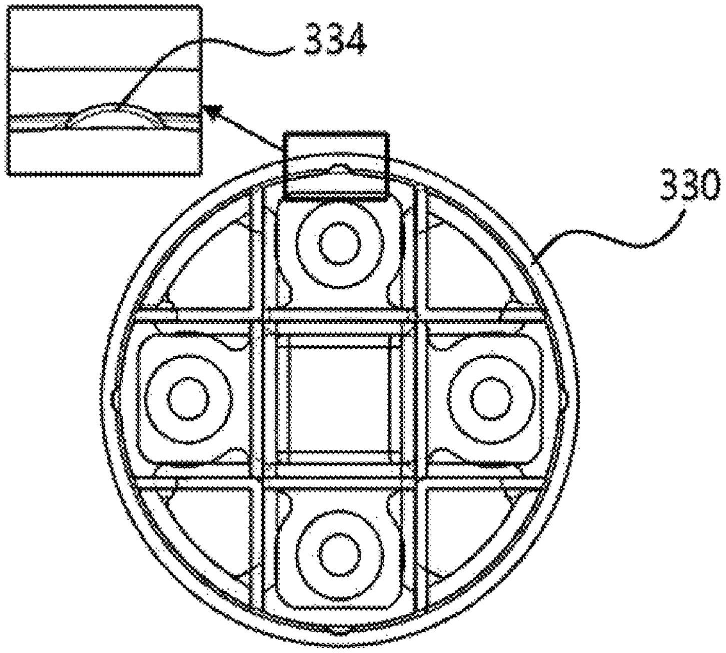
FIG. 25 is a diagram showing a fixed recess formed on an inner wall of a swivel bracket according to an embodiment of the present disclosure.

Further, as shown in FIGS. 24 and 25, the housing coupling portion 310 may be formed in a double-walled structure of an outer wall 313 and an inner wall 312, such that the swivel bracket 330 may be fittingly inserted into a space between the outer wall 313 and the inner wall 312.

At least one fixed protrusion 311 that protrudes outwardly and may be repeatedly compressed and restored by an elastic body provided therein may be provided on an outer circumferential surface of the inner wall 312 of the housing coupling portion 310 as shown in FIG. 24, and at least one fixed recess 334 that is recessed outwardly may be formed on an inner wall of the swivel bracket 330 as shown in FIG. 25.

Accordingly, whenever the housing 100 rotates while the swivel bracket 330 is coupled to the housing coupling portion 310, the fixed protrusion 311 provided in the housing coupling portion 310 may be compressed and then extruded and received in the fixed recess 334 by a resilient force of the elastic body, allowing a changed state after the rotation to be maintained.

The fixed protrusion 311 and the fixed recess 334 may be spaced apart by 90° from the outer circumferential surface of the inner wall 312 of the housing coupling portion 310 and the inner wall of the swivel bracket 330, as shown in FIGS. 24 and 25. Accordingly, whenever the housing 100 rotates by 90°, the fixed protrusion 311 may be received in the fixed recess 334, allowing the changed state after the rotation to be maintained.

Further, the fixed bracket 340 may be coupled to the swivel bracket 330 while threaded onto the steering shaft 20, thereby securing the housing 100 to the steering shaft 20. To this end, the fixed bracket 340 may be provided in a structure in which a groove formed at the center into which the steering shaft 20 may be inserted, one end is open to allow the plate formed on the swivel bracket 330 to be inserted and bolted, and the other end is closed to prevent the coupled steering shaft 20 from being dislodged.

However, it is noted that the fixed bracket 340 is not limited to the shape shown in FIG. 18 but may be provided in various shapes that may secure the swivel bracket 330 to a personal mobility apparatus (e.g., the personal mobility apparatus 1).

Figure 26:
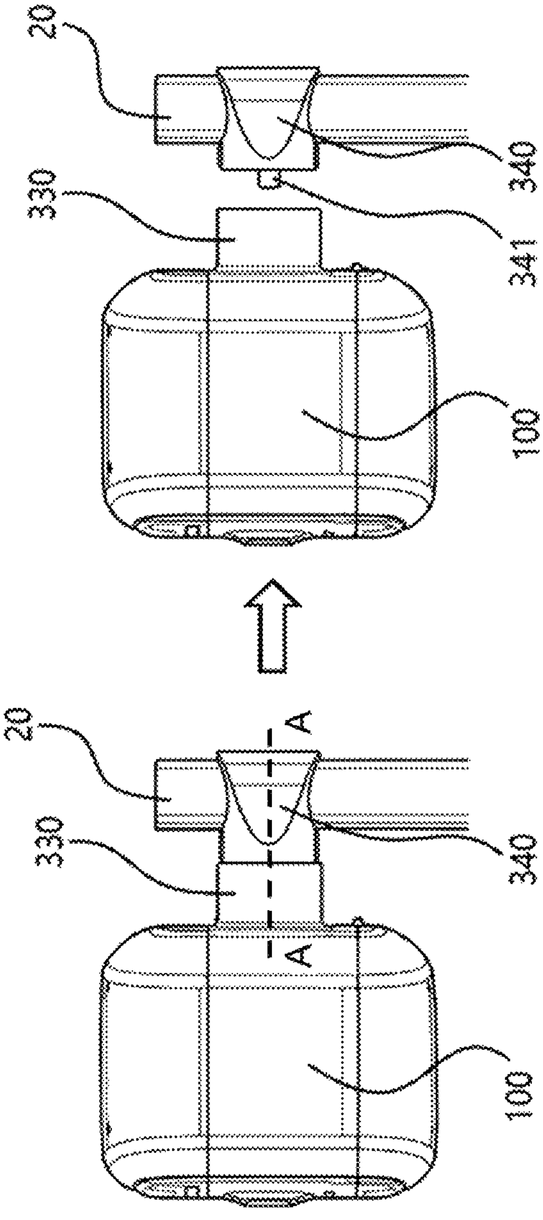
FIG. 26 is a diagram showing a housing coupled to a fixed bracket by snap-fit coupling according to an embodiment of the present disclosure.
Figure 27:
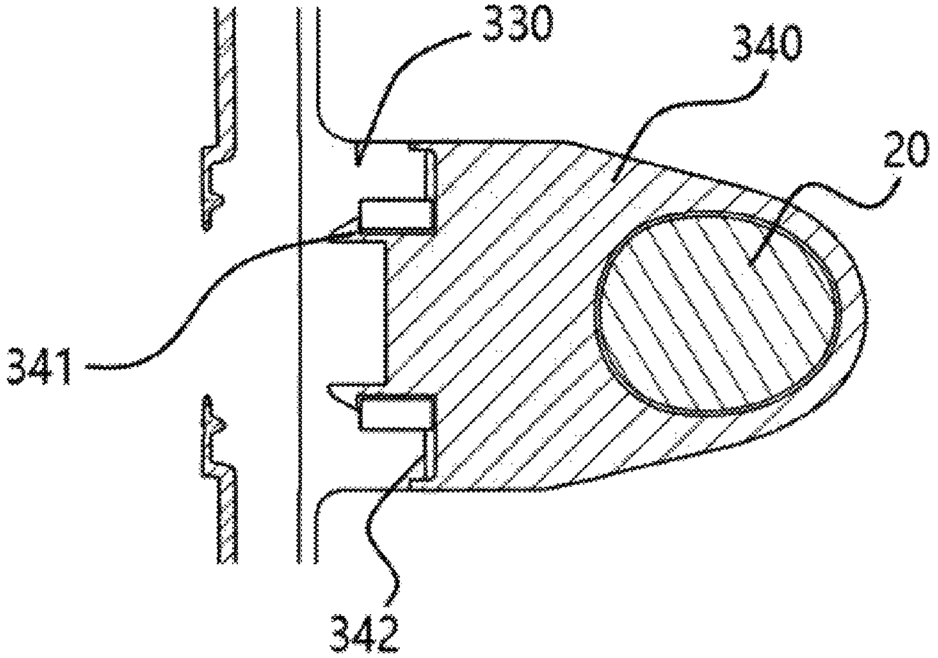
FIG. 27 is a cross-sectional view showing a fixed bracket coupled by a snap pin according to an embodiment of the present disclosure.
Figure 28:
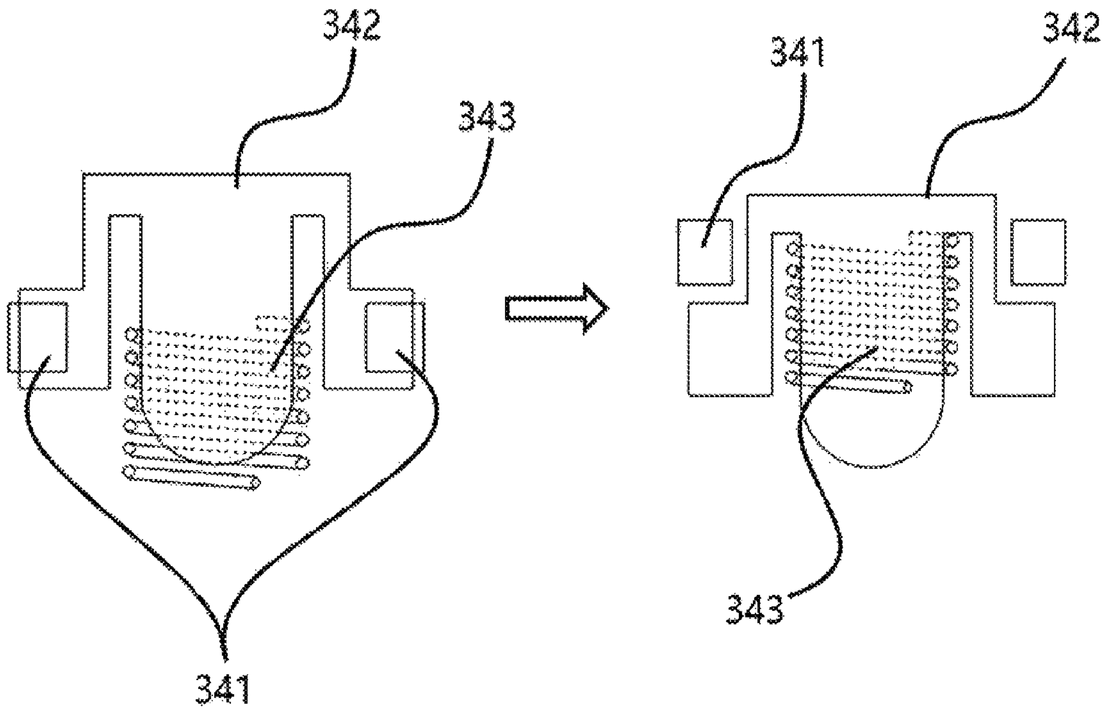
FIG. 28 is a diagram showing a spring being compressed by a detachable switch according to an embodiment of the present disclosure.

Further, the fixed bracket 340 may also be coupled to the swivel bracket 330 by snap-fit coupling while fixed to the steering shaft 20, as shown in FIGS. 26 through 28.

As shown in FIGS. 27 and 28, the fixed bracket 340 may include a fixed bracket hook 341 at one end, a detachable switch 342 adapted to apply an external force to the fixed bracket hook 341 to separate it from the swivel bracket 330, and a spring 343 adapted to be compressed by the external force applied by the detachable switch 342 and return to its original state when the external force is removed, and to maintain a coupling state of the fixed bracket hook 341.

In this way, when the fixed bracket 340 is coupled to the swivel bracket 330 by snap-fit coupling that facilitates separation or coupling by an operation of the detachable switch 342, the convenience of coupling and separating the housing 100 may be improved.

Further, the housing 100 may be coupled to the fixed bracket 340 fixed to the steering shaft 20 in a rotatable structure by the swivel hinge 330 and the swivel bracket 340, and may also be fixed to the fixed bracket 340 in a non-rotatable structure by bolted coupling or snap-fit coupling or the like.

Figure 29:
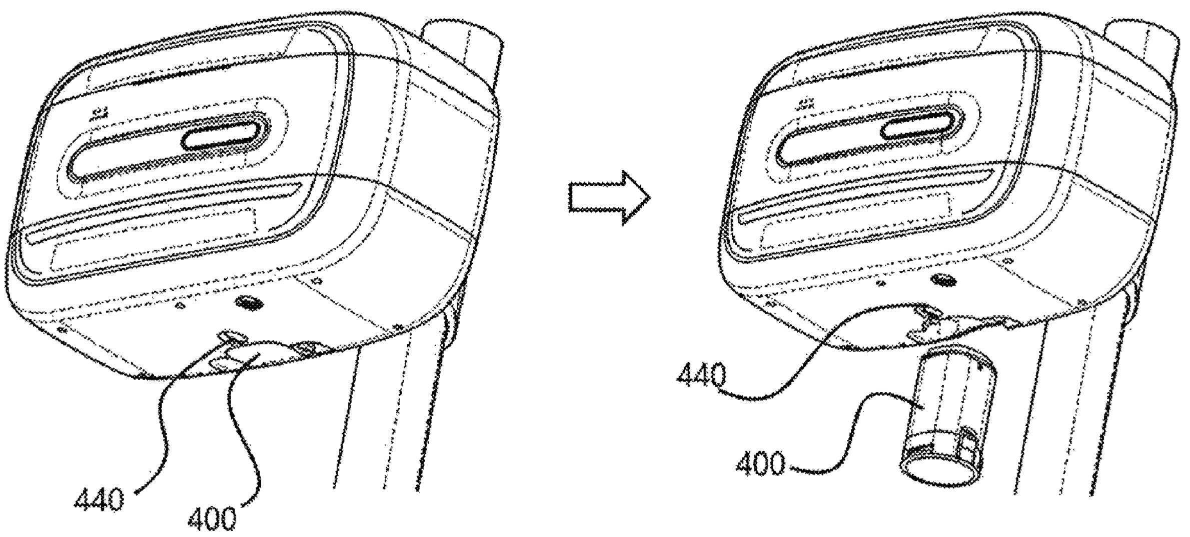
FIG. 29 is a diagram showing a detachable battery being detached according to an embodiment of the present disclosure.

As shown in FIG. 29, the present disclosure may also include a detachable battery 400 adapted to provide power for charging the airbag module 10 through the charging module 12, and a battery receiving portion 410 formed on the bottom surface of the housing 100 for an electrical connection to the charging module 12 as a space in which the detachable battery 400 is mounted. The left side of FIG. 29 shows a state where the detachable battery 400 is mounted in the battery receiving portion 410, and the right side thereof shows a state where the detachable battery 400 is separated.

Figure 30:
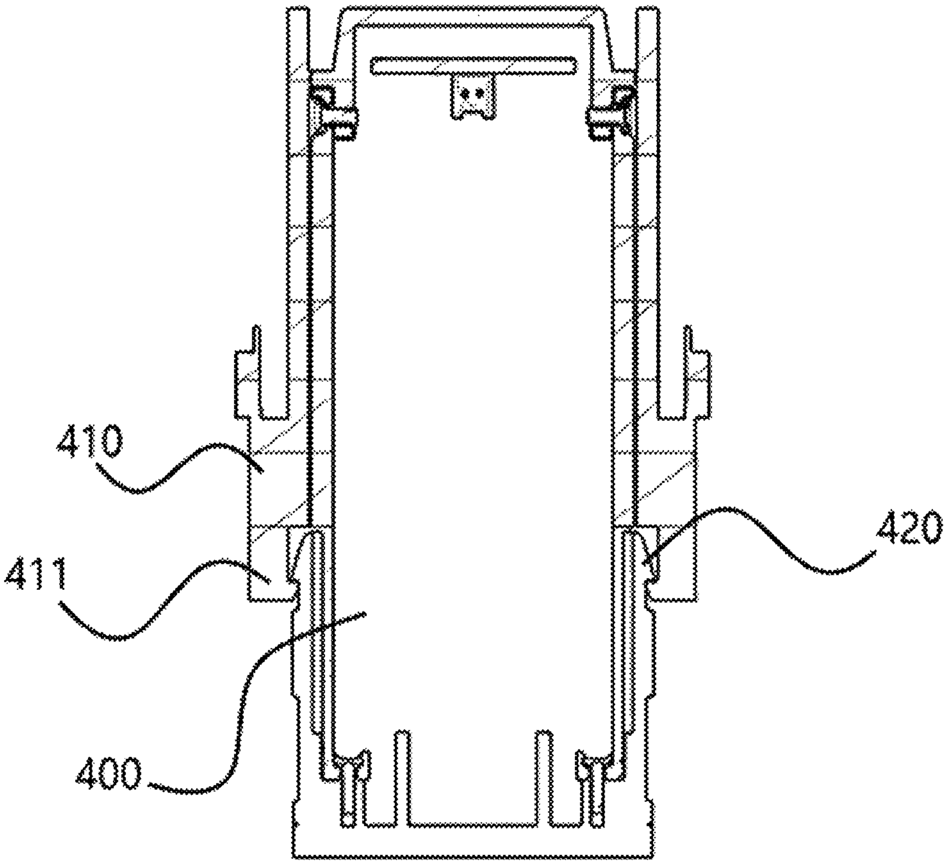
FIG. 30 is a cross-sectional view showing a detachable battery coupled to a battery receiving portion through snap-fit coupling according to an embodiment of the present disclosure.

As shown in FIG. 30, the detachable battery 400 may have a battery hook 420 formed on an outer side for snap-fit coupling, and the battery receiving portion 410 may have a battery catching protrusion 411 onto which the battery hook 420 is caught.

Accordingly, by simply pushing the detachable battery 400 into the battery receiving portion 410, the battery hook 420 may be caught on the battery catching protrusion 411, facilitating the coupling.

Further, the detachable battery 400 may have an inwardly recessed battery groove 430 for battery locking on an outer side, and the battery receiving portion 410 may have a battery locking device 440 that is inserted into or released from the battery groove 430 by a rotational operation.

Figure 31:
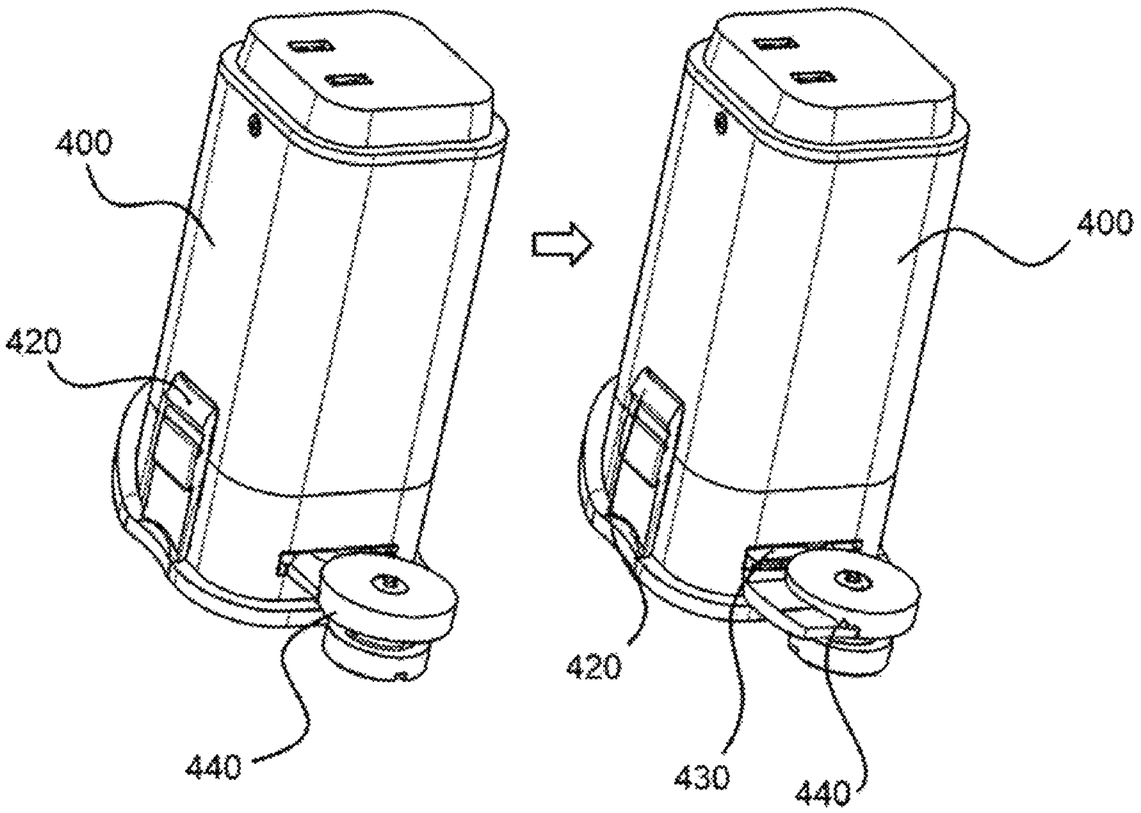
FIG. 31 is a perspective view showing a state where a detachable battery is fixed to a battery receiving portion by a battery locking device according to an embodiment of the present disclosure.
Figure 32:
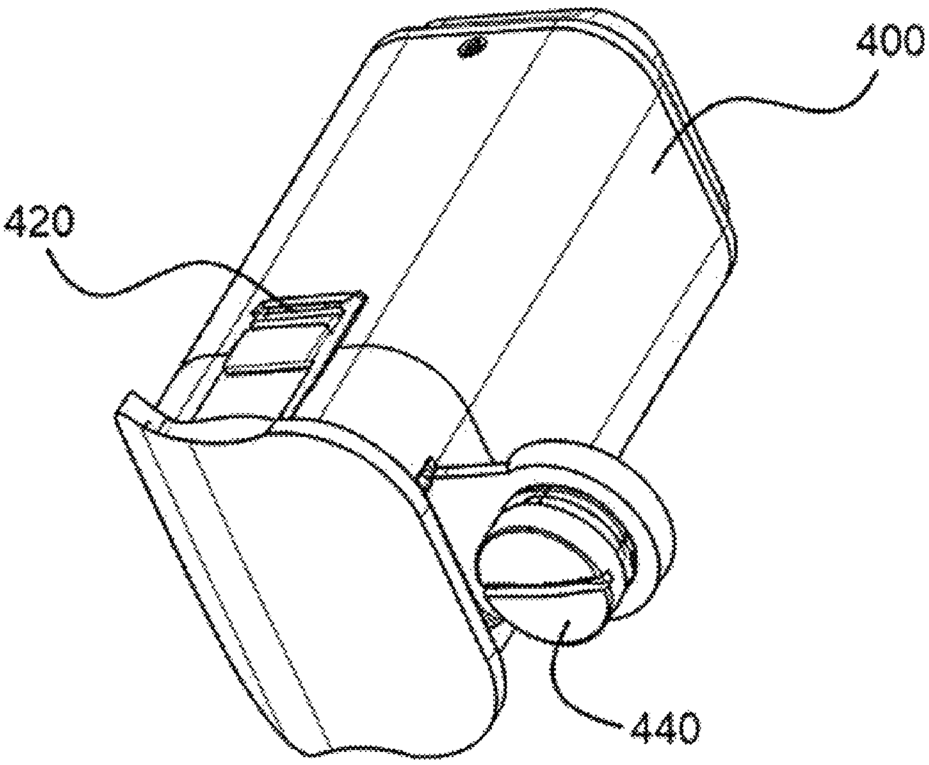
FIG. 32 is a bottom perspective view showing a state where a detachable battery is fixed by a battery locking device according to an embodiment of the present disclosure.

Accordingly, as shown on the left side of FIG. 31 and in FIG. 32, while the detachable battery 400 is mounted in the battery receiving portion 410, the battery locking device 440 may be inserted into the battery groove 430 to keep it locked, which may prevent the detachable battery 400 from being dislodged by an unexpected external impact.

Figure 33:
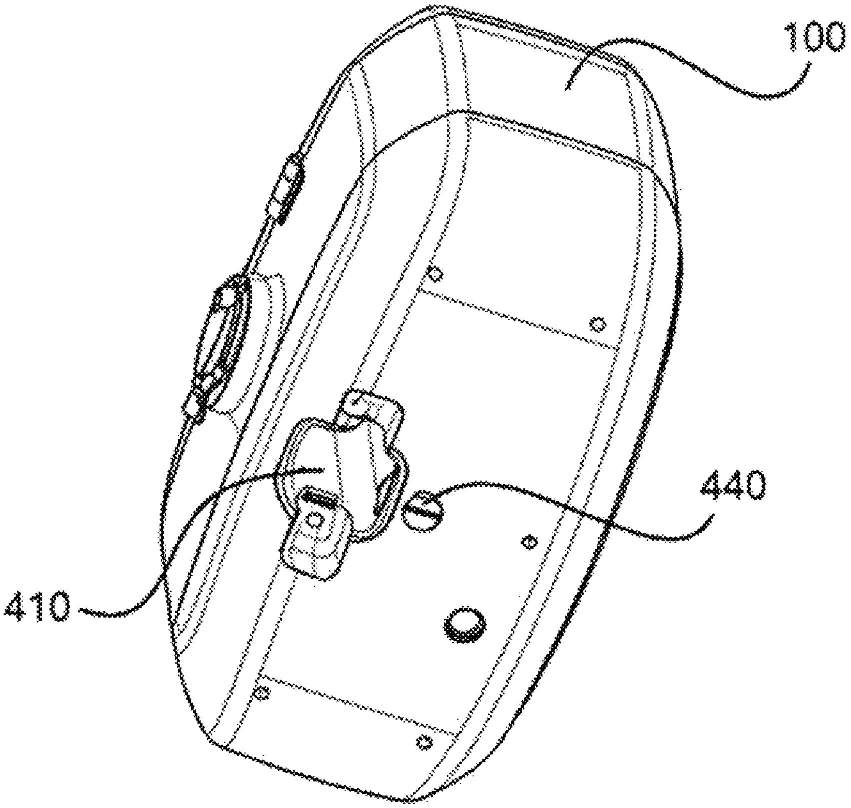
FIG. 33 is a bottom perspective view showing a housing from which a detachable battery is separated according to an embodiment of the present disclosure.

Further, as shown on the right side of FIG. 31 and in FIG. 33, to release the detachable battery 400, the battery locking device 440 may be rotationally operated to be released from the battery groove 430, and the battery hook 420 may then be operated to be separated from the battery receiving portion 410.

It may be desirable that the battery locking device 440 is rotatable with a thin object such as a key or a special tool inserted into a recessed operation part to prevent it from being easily rotated by an unexpected external force.

Further, the detachable battery 400 may be charged while mounted in the battery receiving portion 410 through a power line connected to a power source such as a separate external battery, to facilitate the ease of use. For this purpose, a power terminal to which the power line for providing power to the detachable battery 400 is connected may need to be provided on the bottom surface of the housing 100.

While example embodiments of the present disclosure have been shown and described above, it can be apparent to one of ordinary skill in the art that various modifications or changes in form and details may be made in these embodiments without departing from the spirit and scopes of the claims and their equivalents.

What is claimed is:

1. A safety device storage kit for a personal mobility apparatus, comprising:
- an airbag module wearable on a user, wherein the airbag module includes an airbag adapted to wrap around the user while being worn;
- a housing to receive the airbag module therein, wherein the airbag module is removable from the housing to be worn by the user;
- a cover adapted to cover the housing; and
- a fastening portion adapted to mount the housing to the personal mobility apparatus,
- wherein the housing comprises an inner wall portion configured to support an inner circumferential surface of the airbag module, wherein the inner wall portion comprises:
  - a barrier wall protruding from a center of a first side wall of the housing toward an inner space;
  - a first inner wall spaced apart from a first side of the barrier wall and protruding from a bottom surface of the housing toward an upper space; and
  - a second inner wall spaced apart from a second side of the barrier wall and protruding from the bottom surface of the housing toward the upper space, wherein the second side of the barrier wall is opposite the first side of the barrier wall.

2. The kit of claim 1, wherein the airbag module comprises:
- a sensor configured to sense an external impact,
- a controller configured to determine whether to deploy the airbag,
- a battery configured to provide power, and
- a charging portion configured to receive power for charging the battery in the housing; and
- wherein the housing comprises a mounting portion recessed on a bottom of the housing configured to receive the charging portion therein.

3. The kit of claim 2, wherein the mounting portion comprises a charging terminal adapted to provide power for charging the battery or for charging a smart device.

4. The kit of claim 3, wherein the mounting portion further comprises a guide portion extending toward both sides of the charging terminal configured to temporarily retain two sides of the smart device.

5. The kit of claim 2, wherein the housing further comprises a heat exchanger adapted to start operating as a cooling device upon detecting that a cooling target is received in the mounting portion and stop operating upon detecting that the cooling target is removed from the mounting portion.

6. The kit of claim 2, wherein the housing further comprises a pressure sensor provided on a bottom of the mounting portion to detect an object being received.

7. The kit of claim 6, wherein the housing further comprises a housing controller, wherein the pressure sensor is adapted to measure a change in stroke value induced by being pressed by the object and transmit the change to the housing controller, and wherein the housing controller is adapted to determine whether the airbag module is received based on the change in the stroke value.

8. The kit of claim 1, further comprising:
- a detachable battery adapted to provide power for charging the airbag module through a charging portion; and
- a battery receiving portion configured to provide a space in which the detachable battery is mounted, located on a bottom surface of the housing, and configured to be electrically connected to the charging portion.

9. The kit of claim 8, wherein the detachable battery has a battery hook formed on a first outer side of the detachable battery for snap-fit coupling, and the battery receiving portion has a battery catching protrusion on which the battery hook is configured to be hung; or
- the detachable battery has an inwardly recessed battery groove provided on a second outer side of the detachable battery for battery locking, and the battery receiving portion has a battery locking device configured to be inserted into or released from the battery groove by a rotational operation.

10. A safety device storage kit for a personal mobility apparatus, comprising:
- an airbag module wearable on a user, wherein the airbag module includes an airbag adapted to wrap around the user while being worn;
- a housing configured to receive the airbag module therein;
- a cover adapted to cover the housing; and
- a fastening portion adapted to mount the housing to the personal mobility apparatus, wherein the fastening portion includes:
  - a housing coupling portion comprising a body fixed to one side of the housing,
  - a swivel hinge adapted to rotate by an external force while being fastened to the housing coupling portion,
  - a swivel bracket adapted to provide a space in which the swivel hinge rotates, and
  - a fixed bracket coupled to the swivel bracket.

11. The kit of claim 10, wherein the swivel hinge comprises:
- a first fixing portion fixed to the housing coupling portion;
- a second fixing portion disposed on a bottom surface of the first fixing portion and fixed to the swivel bracket; and
- a rotation shaft coupled perpendicularly to the first fixing portion and the second fixing portion that overlap each other, such that the first fixing portion and the second fixing portion have a same rotation center but rotate at different heights.

12. The kit of claim 11, wherein the swivel bracket has, on a first side thereof, a fixing portion fastening groove to which the second fixing portion is bolted, and has, on a second side thereof, a bracket fastening groove to which the fixed bracket is bolted.

13. The kit of claim 12, wherein the fixing portion fastening groove includes a first-first-alternative fixing portion fastening groove located on an upper portion and a second-first-alternative fixing portion fastening groove located on a lower portion with respect to an area in which the rotation shaft is disposed, or wherein the fixing portion fastening groove includes a first-second-alternative fixing portion fastening groove located on a left side and a second-second-alternative fixing portion fastening groove located on a right side with respect to the area in which the rotation shaft is disposed.

14. The kit of claim 13, wherein the swivel bracket further comprises at least one stopper protruding from the fixing portion fastening groove to limit a rotation direction and a rotation radius of the first fixing portion.

15. The kit of claim 14, wherein the at least one stopper comprises:
- a first stopper installed at one diagonal position of both sides of the fixing portion fastening groove with respect to a position of the rotation shaft and formed to protrude to limit a rotation of the first fixing portion, and
- a second stopper installed at another diagonal position of the both sides and formed to protrude to support the fixing portion fastening groove to which the second fixing portion is coupled without limiting the rotation of the first fixing portion.

16. The kit of claim 10, wherein the housing coupling portion is formed in a double-walled structure with an outer wall and an inner wall, and wherein the swivel bracket is inserted in a space between the outer wall and the inner wall.

17. The kit of claim 16, wherein at least one fixed protrusion protrudes outwardly and is adapted to be repeatedly compressed by an elastic body provided therein, the at least one fixed protrusion located on an outer circumferential surface of the inner wall of the housing coupling portion, wherein at least one fixed recess recessed outwardly is on an inner wall of the swivel bracket.

18. The kit of claim 10, wherein the fixed bracket comprises:
- a detachable switch adapted to apply an external force to separate the fixed bracket from the swivel bracket;
- a first spring adapted to be compressed by an external force applied to the detachable switch and restored to its original state upon removal of the external force; and
- a fixed bracket hook comprising a catching protrusion to which the swivel bracket is adapted to be coupled by snap-fit coupling, and adapted to be released from the swivel bracket by a compression of a second spring and adapted to remain coupled to the swivel bracket upon removal of the external force.

19. A safety device storage kit for a personal mobility apparatus, comprising:
- an airbag module including an airbag;
- a housing including interior walls, the housing being configured to receive the airbag module therein within bounds of the interior walls, wherein the airbag module is removable from the housing to be worn by a user;
- a fastening portion adapted to mount the housing to the personal mobility apparatus; and
- a plurality of ultraviolet-spectrum light-emitting diodes distributed and disposed on the interior walls of the housing and configured to radiate on at least some surfaces of the airbag, wherein the interior walls each comprise:

a barrier wall protruding from a center of a first side wall of the housing toward an inner space;

a first inner wall spaced apart from a first side of the barrier wall and protruding from a bottom surface of the housing toward an upper space; and a second inner wall spaced apart from a second side of the barrier wall and protruding from the bottom surface of the housing toward the upper space, wherein the second side of the barrier wall is opposite the first side of the barrier wall.

* * * * *